United States Patent
Zhang et al.

(10) Patent No.: US 9,615,090 B2
(45) Date of Patent: Apr. 4, 2017

(54) PARSING SYNTAX ELEMENTS IN THREE-DIMENSIONAL VIDEO CODING

(71) Applicant: QUALCOMM Incorporated, San Diego, CA (US)

(72) Inventors: Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 14/140,961

(22) Filed: Dec. 26, 2013

(65) Prior Publication Data

US 2014/0184740 A1 Jul. 3, 2014

Related U.S. Application Data

(60) Provisional application No. 61/747,137, filed on Dec. 28, 2012.

(51) Int. Cl.

| | |
|---|---|
| *H04N 19/597* | (2014.01) |
| *H04N 19/503* | (2014.01) |
| *H04N 19/159* | (2014.01) |
| *H04N 19/70* | (2014.01) |
| *H04N 19/51* | (2014.01) |
| *H04N 19/44* | (2014.01) |

(Continued)

(52) U.S. Cl.
CPC ..... *H04N 19/00769* (2013.01); *H04N 19/139* (2014.11); *H04N 19/159* (2014.11); *H04N 19/44* (2014.11); *H04N 19/46* (2014.11); *H04N 19/503* (2014.11); *H04N 19/51* (2014.11); *H04N 19/593* (2014.11); *H04N 19/597* (2014.11); *H04N 19/70* (2014.11)

(58) Field of Classification Search
CPC ........... H04N 19/00769; H04N 19/139; H04N 19/159; H04N 19/44; H04N 19/46; H04N 19/503; H04N 19/51; H04N 19/593; H04N 19/597; H04N 19/70
See application file for complete search history.

(56) References Cited

U.S. PATENT DOCUMENTS

2005/0031031 A1* 2/2005 Osorio ................ G06F 17/2247
375/240.01

OTHER PUBLICATIONS

Liu et al., "3D-CE1.h related: Illumination Compensation for Inter-view Prediction," JCT-3V Meeting, 101 MPEG Meeting, Stockholm (Joint Collaborative Team on 3D Video Coding Extension Development of ISO/IEC JTC1/SC29/WG11 and ITU-T SG. 16), Jul. 11, 2012.*

(Continued)

*Primary Examiner* — Thai Tran
*Assistant Examiner* — Christopher T Braniff
(74) *Attorney, Agent, or Firm* — Shumaker & Sieffert, P.A.

(57) ABSTRACT

When a current view is a dependent texture view, a current coding unit (CU) is not intra coded, and a partitioning mode of the current CU is equal to PART_2N×2N, a video coder obtains, from a bitstream that comprises an encoded representation of the video data, a weighting factor index for the current CU, wherein the current CU is in a picture belonging to a current view. When the current view is not a dependent texture view, or the current CU is intra coded, or the partitioning mode of the current CU is not equal to PART_2N×2N, the video decoder assumes that the weighting factor index is equal to a particular value that indicates that residual prediction is not applied with regard to the current CU.

23 Claims, 17 Drawing Sheets

(51) Int. Cl.
　　　 H04N 19/139　　　(2014.01)
　　　 H04N 19/46　　　 (2014.01)
　　　 H04N 19/593　　　(2014.01)

(56)　　　　References Cited

OTHER PUBLICATIONS

An et al., "Removal of the Parsing Dependency of Inter-View Prediction," JCT-3V Meeting, Shanghai (Motion Picture Expert Group of ISO/IEC JTC1/SC29/WG11), No. m26833, Oct. 9, 2012.*
An et al., "3D-CE4.h results on removal of parsing dependency for inter-view residual prediction," JCT-3V Meeting; MPEG Meeting; Geneva; (The Joint Collaborative Team on 3D Video Coding Extension Development of ISO/IEC JTC1/SC29/WG11 and ITU-T SG.16); URL: http://phenix.int-evry.fr/JCT2/,, No. JCT3V-C0138, Jan. 17-23, 2013, 4 pp.
An et al., "Removal of the parsing dependency of inter-view residual prediction," MPEG Meeting; Shanghai; (Motion Picture Expert Group or ISO/IEC JTC1/SC29/WG11), No. m26833, JCT3V-B0093, Oct. 13-19, 2012,6 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Ikai, "3D-CE5.h related: Removal of parsing dependency for illumination compensation," JCT-3V Meeting; Incheon; (The Joint Collaborative Team on 3D Video Coding Extension Development of ISO/IEC JTC1/SC29/WG11 and ITU-T SG16 ); URL: http://phenix.int-evry.fr/JCT2/,, No. JCT3V-D0060, Apr. 20-26, 2013, 4 pp.
International Preliminary Report on Patentability—PCT/US2013/077951—The International Bureau of WIPO Geneva, Switzerland, Jan. 20, 2015, 13 pp.
International Search Report and Written Opinion—PCT/US2013/077951—ISAEPO—Mar. 11, 2014, 17 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Li et al.,"3DV-HEVC: Simplified inter-view residual prediction," MPEG Meeting; Geneva; (Motion Picture Expert Group or ISO/IEC JTC1/SC29/WG11), No. m24938, Apr. 2012, 2 pp.
Liu et al., "3D-CE1.h related: Illumination Compensation for Inter-View Prediction," JCT-3V Meeting; MPEG Meeting; Stockholm; (The Joint Collaborative Team on 3D Video Coding Extension Development of ISO/IEC JTC1/SC29/WG11 and ITU-T SG.16); URL: http://phenix.int-evry.fr/JCT2/,, No. JCT3V-A0086, Jul. 16-20, 2012, 7 pp.
Liu et al., "3D-CE2.h: Results of Illumination Compensation for Inter-View Prediction," JCT-3V Meeting; MPEG Meeting; Shanghai; (The Joint Collaborative Team on 3D Video Coding Extension Development of ISO/IEC JTC1/SC29/WG11 and ITU-T SG.16); URL: http://phenix.int-evry.fr/JCT2/,, No. JCT3V-B0045, Oct. 13-19, 2012, 5 pp.
Liu et al., "Restricted Inter-View Residual Prediction," MPEG Meeting; Geneva; (Motion Picture Expert Group or ISO/IEC JTC1/SC29/WG11), No. m24766, May 2012, 6 pp.
Sullivan et al., "Overview of the High Efficiency Video Coding (HEVC) Standard," IEEE Transactions on Circuits and Systems for Video Technology, vol. 22, No. 12, IEEE Service Center, Piscataway, NJ, US, Dec. 2012, 20 pp.
Tech et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, Oct. 13-19, 2012, 118 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, on, Oct. 7-15, 2010, 137 pp.
Zhang et al., "3D-CE4: Advanced residual prediction for multiview coding," Joint Collaborative Team on 3D Video Coding Extension Development of ITU-T SG 16 WP 3 and ISO/IEC JTC 1/SC 29/WG 11, JCT3V-00049, 3rd Meeting: Geneva, CH, Jan. 17-23, 2013, 5 pp.
Zhang et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, Oct. 13-19, 2012, 4 pp.
Zhang et al., "CE4: Advanced residual prediction for multiview coding," JCT3V Meeting; Incheon; (The Joint Collaborative Team on 3D Video Coding Extension Development of ISO/IEC JTC1/SC29/WG11 and ITU-T SG16); URL: http://phenix.int-evry.fr/JCT2/,, No. JCT3V-D0177, Apr. 20-26, 2013, 10 pp.
ITU-T H.264, Series H: Audiovisual and Multimedia Systems, Infrastructure of audiovisual services—Coding of moving video, Advanced video coding for generic audiovisual services, The International Telecommunication Union, Mar. 2010, 674 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.
Bross et al., "High efficiency video coding (HEVC) text specification draft 9," 11th Meeting: Shanghai, CN, Oct. 10-19, 2012, JCTVC-K1003_v13, 317 pp.
Bross et al., "WD4: Working Draft 4 of High-Efficiency Video Coding," 6th Meeting: JCTVC-F803_d6, Torino, IT, Jul. 14-22, 2011, 229 pp.
Tech et al., "3D-HEVC Test Model 1," Joint Collaborative Team on 3D Video Coding Extension Development of ITU-T SG 16 WP 3 and ISO/IEC JTC 1/SC 29/WG 11, JCT3V-A1005_d0, Jul. 16-20, 2012, 83 pp.
Tech et al., "MV-HEVC Working Draft 1," Joint Collaborative Team on 3D Video Coding Extension Development of ITU-T SG 16 WP 3 and ISO/IEC JTC 1/SC 29/WG 11, JCT3V-A1004_d0, Jul. 16-20, 2012, 20 pp.
Tech et al., "MV-HEVC Draft Text 2," Joint Collaborative Team on 3D Video Coding Extension Development of ITU-T SG 16 WP 3 and ISO/IEC JTC 1/SC 29/WG 11, JCT3V-B1004_d0, Oct. 13-19, 2012, 22 pp.
Schwarz et al., "Description of 3D Video Technology Proposal by Fraunhofer HHI (HEVC compatible; configuration B)," ISO/IEC JTC1/SC29/WG11 MPEG2011/M22571, Nov. 2011, 46 pp.
Sullivan et al., "Editors' draft revision to ITU-T Rec. H.264 | ISO/IEC 14496-10 Advanced Video Coding—in preparation for

(56) References Cited

OTHER PUBLICATIONS

ITU-T SG 16 AAP Consent (in integrated form)," Joint Video Team (JVT) of ISO/IEC MPEG & ITU-T VCEG (ISO/IEC JTC1/SC29/WG11 and ITU-T SG16 Q.6), JVT-AD007, Jan. 29-Feb. 3, 2009, 685 pp.

Second Written Opinion of International Application No. PCT/US2013/077951, mailed Oct. 21, 2014, 13 pp.

Response to Written Opinion mailed Mar. 11, 2014, from International Application No. PCT/US2013/077951, dated May 19, 2014, 10 pp.

Response to Second Written Opinion mailed Oct. 21, 2014, from International App. No. PCT/US2013/077951, dated Dec. 15, 2014, 29 pp.

Bross, et al., "High Efficiency Video Coding (HEVC) text specification draft 9," JCT-VC Meeting; (Joint Collaborative Team on Video Coding (JCT-VC) of ITU-T SG16 WP3 and ISO/IEC JTC1/SC29/WG11); Oct. 10-19, 2012, No. JCTVC-K1003_v8, Nov. 7, 2012; 292 pp.

\* cited by examiner

PARSING SYNTAX ELEMENTS IN THREE-DIMENSIONAL VIDEO CODING

This application claims the benefit of U.S. Provisional Patent Application No. 61/747,137, filed Dec. 28, 2012, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into blocks. Blocks in an intra-coded (I) slice of a picture are encoded using spatial prediction with respect to reference samples in neighboring blocks in the same picture. Blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure relates to improving robustness and throughput of video coding extensions, such as multiview and three-dimensional (3D) video coding extensions of High-Efficiency Video Coding (HEVC). In some examples of this disclosure, a video decoder determines a weighting factor based on a weighting factor index. The weighting factor index is subject to a constraint such that the weighting factor index is equal to a particular value when no partition of a current coding unit (CU) has a temporal motion vector or a disparity vector of the current CU is unavailable. The video decoder determines, based on the weighting factor, whether to predict a residual signal for the current CU.

In one example, this disclosure describes a method of decoding video data, the method comprising: when a current view is a dependent texture view, a current coding unit (CU) is not intra coded, and a partitioning mode of the current CU is equal to PART_2N×2N, obtaining, from a bitstream that comprises an encoded representation of the video data, a weighting factor index for the current CU, wherein the current CU is in a picture belonging to a current view; and when the current view is not a dependent texture view, or the current CU is intra coded, or the partitioning mode of the current CU is not equal to PART_2N×2N, assuming that the weighting factor index is equal to a particular value that indicates that residual prediction is not applied with regard to the current CU; determining a weighting factor based on the weighting factor index for the current CU; and determining, based on the weighting factor, whether to predict a residual signal for the current CU.

In another example, this disclosure describes a method of encoding video data, the method comprising: responsive to determining that a current view is a dependent texture view, a current coding unit (CU) is not intra coded, and a partitioning mode of the current CU is equal to PART_2N×2N, including, in a bitstream that comprises an encoded representation of the video data, data indicating a weighting factor index for the current CU, wherein the current CU is in a picture belonging to the current view; responsive to determining that the current view is not a dependent texture view, or the current CU is not intra coded, or the partitioning mode of the current CU is not equal to PART_2N×2N, omitting, from the bitstream, the data indicating the weighting factor index for the current CU; and outputting the bitstream.

In another example, this disclosure describes a video decoding device comprising a memory and one or more processors configured to: when a current view is a dependent texture view, a current coding unit (CU) is not intra coded, and a partitioning mode of the current CU is equal to PART_2N×2N, obtain, from a bitstream that comprises an encoded representation of video data, a weighting factor index for the current CU, wherein the current CU is in a picture belonging to a current view; and when the current view is not a dependent texture view, or the current CU is intra coded, or the partitioning mode of the current CU is not equal to PART_2N×2N, assume that the weighting factor index is equal to a particular value that indicates that residual prediction is not applied with regard to the current CU;

determine a weighting factor based on the weighting factor index for the current CU; and determine, based on the weighting factor, whether to predict a residual signal for the current CU.

In another example, this disclosure describes a video encoding device comprising a memory and one or more processors configured to: responsive to determining that a current view is a dependent texture view, a current coding unit (CU) is not intra coded, and a partitioning mode of the current CU is equal to PART_2N×2N, include, in a bitstream that comprises an encoded representation of video data, data indicating a weighting factor index for the current CU, wherein the current CU is in a picture belonging to the current view; responsive to determining that the current view is not a dependent texture view, or the current CU is not intra coded, or the partitioning mode of the current CU is not equal to PART_2N×2N, omit, from the bitstream, the data indicating the weighting factor index for the current CU; and output the bitstream.

In another example, this disclosure describes a video decoding device comprising: means for obtaining, when a current view is a dependent texture view, a current coding unit (CU) is not intra coded, and a partitioning mode of the current CU is equal to PART_2N×2N, from a bitstream that comprises an encoded representation of video data, a weighting factor index for the current CU, wherein the current CU is in a picture belonging to a current view; and means for assuming, when the current view is not a dependent texture view, or the current CU is intra coded, or the partitioning mode of the current CU is not equal to PART_2N×2N, that the weighting factor index is equal to a particular value that indicates that residual prediction is not applied with regard to the current CU; means for determining a weighting factor based on the weighting factor index for the current CU; and means for determining, based on the weighting factor, whether to predict a residual signal for the current CU.

In another example, this disclosure describes a video encoding device comprising: means for including, responsive to determining that a current view is a dependent texture view, a current coding unit (CU) is not intra coded, and a partitioning mode of the current CU is equal to PART_2N×2N, in a bitstream that comprises an encoded representation of video data, data indicating a weighting factor index for the current CU, wherein the current CU is in a picture belonging to the current view; means for omitting, responsive to determining that the current view is not a dependent texture view, or the current CU is not intra coded, or the partitioning mode of the current CU is not equal to PART_2N×2N, from the bitstream, the data indicating the weighting factor index for the current CU; and means for outputting the bitstream.

In another example, this disclosure describes a non-transitory computer-readable data storage medium having instructions thereon that when executed by one or more processors of a video decoding device cause the video decoding device to: obtain, when a current view is a dependent texture view, a current coding unit (CU) is not intra coded, and a partitioning mode of the current CU is equal to PART_2N×2N, from a bitstream that comprises an encoded representation of video data, a weighting factor index for the current CU, wherein the current CU is in a picture belonging to a current view; and assume, when the current view is not a dependent texture view, or the current CU is intra coded, or the partitioning mode of the current CU is not equal to PART_2N×2N, that the weighting factor index is equal to a particular value that indicates that residual prediction is not applied with regard to the current CU; determine a weighting factor based on the weighting factor index for the current CU; and determine, based on the weighting factor, whether to predict a residual signal for the current CU.

In another example, this disclosure describes a non-transitory computer-readable data storage medium having instructions thereon that when executed by one or more processors of a video encoding device cause the video encoding device to: include, responsive to determining that a current view is a dependent texture view, a current coding unit (CU) is not intra coded, and a partitioning mode of the current CU is equal to PART_2N×2N, in a bitstream that comprises an encoded representation of video data, data indicating a weighting factor index for the current CU, wherein the current CU is in a picture belonging to the current view; omit, responsive to determining that the current view is not a dependent texture view, or the current CU is not intra coded, or the partitioning mode of the current CU is not equal to PART_2N×2N, from the bitstream, the data indicating the weighting factor index for the current CU; and output the bitstream.

In another example, this disclosure describes a method of decoding video data, the method comprising: obtaining, from a bitstream that conforms to a video coding standard and includes an encoded representation of the video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and responsive to determining based on the illumination compensation flag that illumination compensation is to be performed for the current CU, performing illumination compensation for the current CU.

In another example, this disclosure describes a method of encoding video data, the method comprising: including, in a bitstream that conforms to a video coding standard and includes an encoded representation of the video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and outputting the bitstream.

In another example, this disclosure describes a video decoding device comprising a memory and one or more processors configured to: obtain, from a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and responsive to determining based on the illumination compensation flag that illumination compensation is to be performed for the current CU, perform illumination compensation for the current CU.

In another example, this disclosure describes a video encoding device comprising a memory and one or more processors configured to: include, in a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and output the bitstream.

In another example, this disclosure describes a video decoding device comprising means for obtaining, from a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and means for performing, responsive to determining based on the illumination compensation flag that illumination compensation is to be performed for the current CU, illumination compensation for the current CU.

In another example, this disclosure describes a video encoding device comprising: means for including, in a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and means for outputting the bitstream.

In another example, this disclosure describes a non-transitory computer-readable data storage medium having instructions thereon that when executed by one or more processors of a video decoding device cause the video decoding device to: obtain, from a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and responsive to determining based on the illumination compensation flag that illumination compensation is to be performed for the current CU, perform illumination compensation for the current CU.

In another example, this disclosure describes a non-transitory computer-readable data storage medium having instructions thereon that when executed by one or more processors of a video encoding device cause the video encoding device to: include, in a bitstream that conforms to a video coding standard and includes an encoded representation of video data, an illumination compensation flag that indicates whether illumination compensation is used for a current coding unit (CU), wherein the video coding standard subjects the illumination compensation flag to a constraint that requires the illumination compensation flag to specify a value that indicates that illumination compensation is not used for the current CU if no PU of the current CU uses an inter-view reference picture; and output the bitstream.

In another example, this disclosure describes a method of decoding video data, the method comprising: obtaining, from a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and responsive to determining based on the residual prediction flag that residual prediction is used for the current CU, perform residual prediction for the current CU.

In another example, this disclosure describes a method of encoding video data, the method comprising: including, in a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and outputting the bitstream.

In another example, this disclosure describes a video decoding device comprising a memory and one or more processors configured to: obtain, from a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and responsive to determining based on the residual prediction flag that residual prediction is used for the current CU, perform residual prediction for the current CU.

In another example, this disclosure describes a video encoding device comprising a memory and one or more processors configured to: include, in a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and output the bitstream.

In another example, this disclosure describes a video decoding device comprising: means for obtaining, from a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and means for performing, responsive to determining based on the residual prediction flag that residual prediction is used for the current CU, residual prediction for the current CU.

In another example, this disclosure describes a video encoding device comprising: means for including, in a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and means for outputting the bitstream.

In another example, this disclosure describes a non-transitory computer-readable data storage medium having instructions stored thereon that when executed by one or more processors of a video decoding device cause the video decoding device to: obtain, from a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and responsive to determining based on the residual prediction flag that residual prediction is used for the current CU, perform residual prediction for the current CU.

In another example, this disclosure describes a non-transitory computer-readable data storage medium having instructions stored thereon that when executed by one or more processors of a video encoding device cause the video encoding device to: include, in a bitstream that conforms to a video coding standard and includes an encoded representation of video data, a residual prediction flag for a current coding unit (CU), wherein the residual prediction flag for the current CU equal to 0 indicates that residual prediction is not used for the current CU, and the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the corresponding block is in a reference view picture; and output the bitstream.

The details of one or more examples of the disclosure are set forth in the accompanying drawings and the description below. Other features, objects, and advantages will be apparent from the description, drawings, and claims.

DETAILED DESCRIPTION

Figure 1:
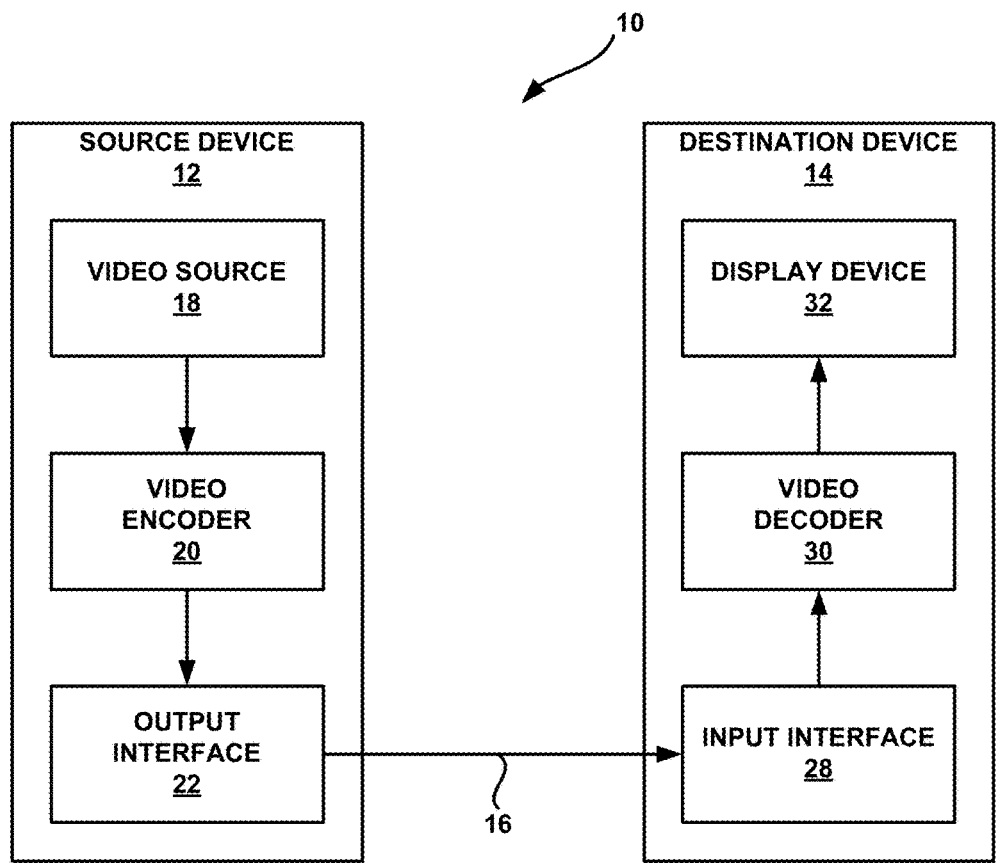
FIG. 1 is a block diagram illustrating an example video coding system that may utilize the techniques described in this disclosure.

High-Efficiency Video Coding (HEVC) is a newly-developed video coding standard. In HEVC and its multi-view and three-dimensional video coding extensions (i.e., MV-HEVC and 3D-HEVC, respectively), a video encoder generates a bitstream. The bitstream comprises an encoded representation of video data. A video decoder performs a parsing operation to obtain syntax elements from the bitstream. In general, a syntax element is an element of data represented in a bitstream. In addition, the video decoder performs a decoding operation that uses syntax elements obtained from the bitstream to reconstruct sample blocks of the video data.

As detailed in this disclosure, there are some instances where the parsing operation may need to have information generated in the decoding operation in order to obtain particular syntax elements from the bitstream. For instance, the determination of whether the bitstream includes a particular syntax element may be dependent on information generated by the decoding operation. Thus, the parsing process may be dependent on information generated by the decoding process in order to determine whether to obtain a syntax element from the bitstream. Such dependencies may slow the parsing process, which may in turn slow the decoding process.

In one particular example, a syntax structure associated with a current coding unit (CU) may or may not include a weighting factor index syntax element that indicates an index to a weighting factor for use in residual prediction. If the weighting factor index syntax element for the current CU is equal to a particular value (e.g., 0), residual prediction is not used for the current CU. In residual prediction, a video coder may determine a residual predictor based on samples in a disparity reference picture and a temporal disparity reference picture. The disparity reference picture and the temporal disparity reference picture are in a reference view that is different than a view associated with the current CU. The disparity reference picture is in the same access unit as the current CU. A video coder may use a disparity vector and a temporal motion vector of the current CU to determine the samples in the disparity reference picture and the temporal disparity reference picture. Hence, residual prediction with regard to the current CU may only be possible if one or more partitions of the current CU (e.g., prediction units (PUs) of the current CU) have temporal motion vectors (i.e., motion vectors that indicate reference pictures in different time instances than the current CU) and if a disparity vector for the current CU is available. In some examples, the phrase "disparity vector for the current CU" may denote a disparity vector for the CU as a whole or a disparity vector for a PU forming part of the CU.

In the example of the previous paragraph, the weighting factor index syntax element could potentially have a value other than 0, even though no partition of the current CU has a temporal disparity vector or the disparity vector for the current CU is unavailable. If the weighting factor index syntax element is equal to a value other than 0 and no partition of the current CU has a temporal motion vector or the disparity vector for the current CU is unavailable, a decoding error may occur. Hence, some proposals have called for a video decoder to determine, prior to obtaining the weighting factor index syntax element from the bitstream, whether any PU of the current CU has a temporal motion vector and to determine whether the disparity vector of the CU is available. In such proposals, the video decoder obtains the weighting factor index syntax element from the bitstream only if a partition of the current CU has a temporal motion vector and the disparity vector for the current CU is available. However, determining whether any partition of the current CU has a temporal motion vector and determining whether a disparity vector of the current CU is available may require information generated by the decoding process. Thus, determining whether any partition of the current CU has a temporal motion vector and determining whether a disparity vector of the current CU is available introduces in the parsing process a dependence on information generated by the decoding process.

Examples of this disclosure may reduce the dependence of the parsing process on information generated by the decoding process. For instance, in the example of the previous paragraph, a constraint may be introduced such that if none of the partitions in the current CU has a temporal motion vector (e.g., the reference picture is from the same view), and/or the disparity vector of the current CU is unavailable, the weighting factor index shall be 0. In other words, when no partition of the current CU has a temporal motion vector and/or the disparity vector of the current CU is unavailable, a video encoder may only set the weighting factor index syntax element to 0 (meaning that residual prediction is not used). Because the constraint ensures that the weighting factor index syntax element is set to 0 under these circumstances, the video decoder does not need to check whether any partition of the current CU has a temporal motion vector and/or check whether the disparity vector for the current CU is available in order to ensure that the type of decoding error mentioned above does not occur. Thus, the constraint mentioned above may eliminate the occurrence of this decoding error while also eliminating a dependency of the parsing process on information generated in the decoding process.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC)

extension, and MVC-based 3DV extension. Furthermore, there is an ongoing effort to generate a three-dimensional video (3DV) coding extension to H.264/AVC, namely AVC-based 3DV. A joint draft of the MVC extension of H.264 is described in "Advanced video coding for generic audiovisual services," ITU-T Recommendation H.264, March 2010. In other examples, video encoder 20 and video decoder 30 may operate according to ITU-T H.261, ISO/IEC MPEG-1 Visual, ITU-T H.262 or ISO/IEC MPEG-2 Visual, and ITU-T H.263, ISO/IEC-4 Visual. Thus, video encoder 20 and video decoder 30 may operate according to video coding standards including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and MVC extensions.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 9" is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11$^{th}$ Meeting, Shanghai, China, October 2012. Furthermore, there are ongoing efforts to produce scalable video coding, multi-view coding, and 3DV extensions for HEVC. The scalable video coding extension of HEVC may be referred to as SHEVC. Video encoder 20 and video decoder 30 may operate according to such extensions to the HEVC standard.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). For 3D-HEVC, new coding tools, including those in the coding unit/prediction unit level, for both texture and depth views may be included and supported. As of Dec. 19, 2013, software for 3D-HEVC (i.e., 3D-HTM version 6.0) can be downloaded from the following link:
[3D-HTM]: https://hevc.hhi.fraunhofer.de/svn/svn_3DVCSoftware/tags/HTM-6.0/

In general, the motion compensation loop of HEVC is the same as that in H.264/AVC. For example, the reconstruction of a current frame Î may equal de-quantized coefficients r plus temporal prediction P:

$$\hat{I}=r+P.$$

In the formula above, P indicates uni-directional prediction for P frames or bi-directional prediction for B frames.

However, the unit of motion compensation in HEVC is different from that in previous video coding standards. For example, the concept of a macroblock in previous video coding standards does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction and a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

A coded slice may comprise a slice header and slice data. The slice header of a slice may be a syntax structure that includes syntax elements that provide information about the slice. The slice data may include coded CTUs of the slice.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU. Hence, in this disclosure, a CU may be said to be partitioned into one or more PUs. For ease of explanation, this disclosure may refer to the size of a prediction block of a PU as simply the size of the PU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on samples of the picture that includes the PU. In this disclosure, the phrase "based on" may indicate "based at least in part on." When predictive blocks of PUs of a CU are generated using intra prediction, the prediction mode (i.e., PredMode) of the current CU is designated as MODE_INTRA. When predictive blocks of PUs of a CU are generated using inter prediction, the prediction mode (i.e., PredMode) of the current CU is designated as MODE_INTER.

If video encoder 20 uses inter prediction to generate the predictive blocks of a PU, video encoder 20 may generate the predictive blocks of the PU based on decoded samples of one or more pictures other than the picture associated with the PU. When inter prediction is used to generate the predictive blocks of a block (e.g., a PU), this disclosure may refer to the block as "inter-coded" or "inter predicted." Inter prediction may be uni-directional (i.e., uni-prediction) or bi-directional (i.e., bi-prediction). To perform inter prediction, video encoder 20 may generate a first reference picture list (RefPicList0) for a current picture and may also generate a second reference picture list (RefPicList1) for the current picture. Each of the reference picture lists may include one or more reference pictures. After a reference picture list is constructed (namely RefPicList0 and RefPicList1 if available), a reference index to a reference picture list can be used to identify any reference picture included in the reference picture list.

When using uni-prediction, video encoder 20 may search the reference pictures in either RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. The motion vector may include a horizontal component and a vertical component. The horizontal component specifies a horizontal displacement between the prediction block of the PU and the reference location and the vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

If video encoder 20 uses inter prediction to generate the predictive blocks of a PU, video encoder 20 may generate the predictive blocks of the PU based on samples of one or more pictures other than the picture associated with the PU. For instance, video encoder 20 may perform uni-directional inter prediction (i.e., uni-prediction) or bi-directional inter prediction (i.e., bi-prediction) on a PU.

In instances where video encoder 20 performs uni-prediction on a PU, video encoder 20 may determine, based on a motion vector of the PU, a reference location in a reference picture. Video encoder 20 may then determine a predictive block for the PU. Each sample in the predictive block for the PU may be associated with the reference location. In some examples, a sample in a predictive block for a PU may be associated with a reference location when the sample is within a block of samples having the same size as the PU and whose top-left corner is the reference location. Each sample in the predictive block may be an actual or interpolated sample of the reference picture.

In instances where video encoder 20 performs bi-prediction on a PU, the PU has two motion vectors. Video encoder 20 may determine, based on the motion vectors of the PU, two reference locations in two reference pictures. Video encoder 20 may then determine, in the manner described above, reference blocks associated with the two reference locations. Video encoder 20 may then determine a predictive block for the PU. Each sample in the predictive block may be a weighted average of corresponding samples in the reference blocks. The weighting of the samples may be based on temporal distances of the reference pictures from the picture containing the PU.

Video encoder 20 may partition a CU into one or more PUs according various partitioning modes. For instance, if intra prediction is used to generate predictive blocks for the PUs of a CU, the CU may be partitioned according to a PART_2N×2N mode or a PART_N×N mode. In the PART_2N×2N mode, the CU only has one PU. In the PART_N×N mode, the CU has four equally-sized PUs having rectangular prediction blocks. If inter prediction is used to generate predictive blocks for the PUs of a CU, the CU may be partitioned according to the PART_2N×2N mode, the PART_N×N mode, a PART_2N×N mode, a PART_N×2N mode, a PART_2N×nU mode, a PART_2N×uD mode, a PART_nL×2N mode, or a PART_nR×2N mode. In the PART_2N×N mode and the PART_N×2N mode, the CU is partitioned into two equally-sized PUs having rectangular prediction blocks. In each of the PART_2N×nU mode, the PART_2N×uD mode, the PART_nL×2N mode, and the PART_nR×2N mode, the CU is partitioned into two unequally-sized PUs having rectangular prediction blocks.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), video encoder 20 may quantize the coefficient block. Quantization generally refers to a process in which transform coefficients are quantized to possibly reduce the amount of data used to represent the transform coefficients, providing further compression. Video encoder 20 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In some examples, the QP value associated with the CU may be associated with the current picture or slice as a whole. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, SEI, and so on. NAL units that encapsulate RBSPs for video coding data (as opposed to RBSPs for parameter sets and SEI messages) may be referred to as video coding layer (VCL) NAL units.

SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, and include all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 may signal the motion information of a PU using merge/skip mode or advanced motion vector prediction (AMVP) mode. For instance, in HEVC, there are two modes for the prediction of motion parameters, one being the merge/skip mode and the other being AMVP. Motion prediction may comprise the determination of motion information of a video unit (e.g., a PU) based on motion information of one or more other video units. The motion information of a PU may include motion vector(s) of the PU, reference index(es) of the PU, and one or more prediction direction indicators.

When video encoder 20 signals the motion information of a current PU using merge mode, video encoder 20 generates a merge candidate list. In other words, video encoder 20 may perform a motion vector predictor list construction process. The merge candidate list includes a set of merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index (i.e., a merging candidate index) that indicates a position within the candidate list of the selected merge candidate. Video decoder 30 may obtain, from the bitstream, the index into the candidate list (i.e., the merging candidate index). In addition, video decoder 30 may generate the same merge candidate list and may determine, based on the merging candidate index, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points may be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may determine, without use of residual data, a prediction block for the PU based on a reference block indicated by the motion information of a selected candidate in the merge candidate list.

AMVP mode is similar to merge mode in that video encoder 20 may generate a candidate list and may select a candidate from the candidate list. However, when video encoder 20 signals the RefPicListX (where X is 0 or 1) motion information of a current PU using AMVP mode, video encoder 20 may signal a RefPicListX motion vector difference (MVD) for the current PU and a RefPicListX reference index for the current PU in addition to signaling a RefPicListX motion vector predictor (MVP) flag for the current PU. The RefPicListX MVP flag for the current PU may indicate the position of a selected AMVP candidate in the AMVP candidate list. The RefPicListX MVD for the current PU may indicate a difference between a RefPicListX motion vector of the current PU and a motion vector of the selected AMVP candidate. In this way, video encoder 20 may signal the RefPicListX motion information of the current PU by signaling a RefPicListX MVP flag, a RefPicListX reference index value, and a RefPicListX MVD. In other words, the data in the bitstream representing the motion vector for the current PU may include data representing a reference index, an index to a candidate list, and an MVD. Thus, the chosen motion vectors may be signaled by transmitting an index into the candidate list. In addition, the reference index values and motion vector differences may also be signaled.

Furthermore, when the motion information of a current PU is signaled using AMVP mode, video decoder 30 may obtain, from the bitstream, a MVD for a current PU and a MVP flag. Video decoder 30 may generate the same AMVP candidate list and may determine, based on the MVP flag, the selected AMVP candidate. In other words, in AMVP, a candidate list of motion vector predictors for each motion hypothesis is derived based on the coded reference index. As before, this list may include motion vectors of neighboring blocks that are associated with the same reference index as well as a temporal motion vector predictor which is derived based on the motion parameters of the neighboring block of the co-located block in a temporal reference picture. Video decoder 30 may recover a motion vector of the current PU by adding the MVD to the motion vector indicated by the selected AMVP candidate. That is, video decoder 30 may determine, based on a motion vector indicated by the selected AMVP candidate and the MVD, the motion vector of the current PU. Video decoder 30 may then use the recovered motion vector or motion vectors of the current PU to generate predictive blocks for the current PU.

Figure 2:
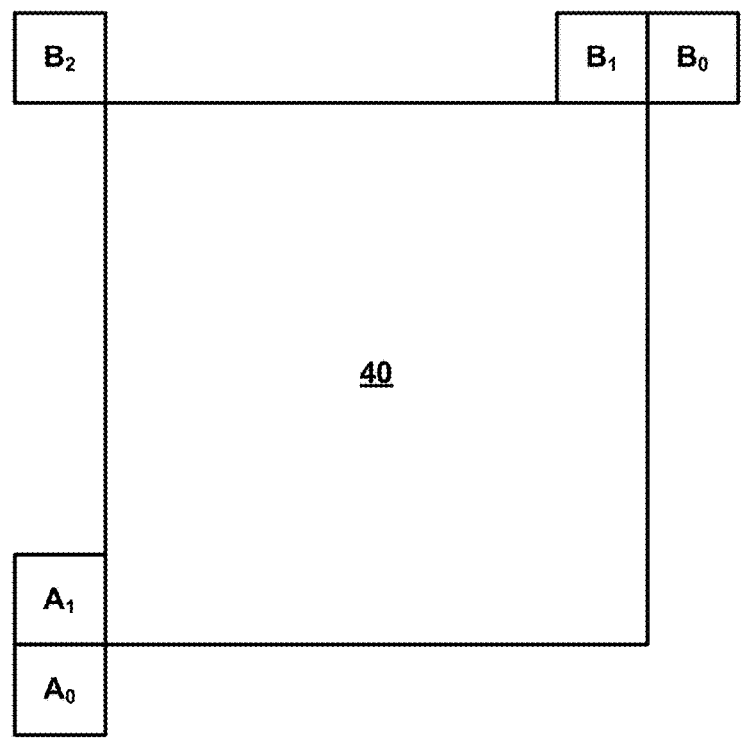
FIG. 2 is a conceptual diagram illustrating example spatially-neighboring prediction units (PUs) relative to a current PU.

When a video coder (e.g., video encoder 20 or video decoder 30) generates an AMVP candidate list for a current PU, the video coder may derive one or more AMVP candidates based on the motion information of PUs (i.e., spatially-neighboring PUs) that cover locations that spatially neighbor the current PU and one or more AMVP candidates based on motion information of PUs that temporally neighbor the current PU. In this disclosure, a PU (or other type of video unit) may be said to "cover" a location if a prediction block of the PU (or other type of sample block of the video unit) includes the location. The candidate list may include motion vectors of neighboring blocks that are associated with the same reference index as well as a temporal motion vector predictor which is derived based on the motion parameters (i.e., motion information) of the neighboring block of the co-located block in a temporal reference picture. FIG. 2 is a conceptual diagram illustrating example spatially-neighboring PUs relative to a current PU 40. In the example of FIG. 2, the spatially-neighboring PUs may be PUs that cover the locations indicated as $A_0$, $A_1$, $B_0$, $B_1$, and $B_2$. A candidate in a merge candidate list or an AMVP candidate list that is based on the motion information of a PU that temporally neighbors a current PU (i.e., a PU that is in a different time instance than the current PU) may be referred to as a TMVP. A TMVP may be used to improve the coding efficiency of HEVC and, different from other coding tools, a TMVP may need to access a motion vector of a frame in a decoded picture buffer, more specifically in a reference picture list.

As mentioned above, a multi-view extension of HEVC (i.e., MV-HEVC) and a 3DV extension of HEVC (i.e., 3D-HEVC) are under development. That is, a Joint Collaboration Team on 3D Video Coding (JCT-3V) of VCEG and MPEG is developing a 3DV standard based on HEVC, for which part of the standardization efforts includes the standardization of the multi-view video codec based on HEVC (MV-HEVC) and another part for 3D Video coding based on HEVC (3D-HEVC). MV-HEVC may guarantee that there are only high-level syntax (HLS) changes to HEVC and that no module at the CU/PU level of HEVC needs to re-designed and all modules at the CU/PU level of HEVC are fully reused for MV-HEVC. 3D-HEVC includes and supports new coding tools, including those at the CU/PU level, for both texture and depth views.

Gerhard Tech et al., "3D-HEVC Test Model Description draft 1," JCT3V-A1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012, provides a reference software description, as well as the working draft, of 3D-HEVC. Gerhard Tech et al., "3D-HEVC Test Model 2," JCT3V-A1005, Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012 (hereinafter, 3D-HEVC Test Model 2") is another working draft of 3D-HEVC. Gerhard Tech et al., "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "JCT3V-A1004"), provides a working draft for MV-HEVC.

As of Dec. 20, 2013, software for 3D-HTM for 3D-HEVC is available from the following link: [3D-HTM version 5.0]: https://hevc.hhilraunhofer.de/svn/svn_3DVCSoftware/tags/HTM-5.0/. Furthermore, as of Dec. 20, 2013, reference software for MV-HEVC based on 3D-HTM is available from: [3D-HTM version 5.1]: https://hevc.hhi.fraunhofer.de/svn/svn_3DVCSoftware/tags/HTM-5.1/.

In MV-HEVC and 3D-HEVC, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. A view component may comprise a texture view component and a depth view component. In this disclosure, a "view" may refer to a sequence of view components associated with the same view identifier.

MV-HEVC and 3D-HEVC support inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In other words, in multi-view coding, inter-view prediction is performed among pictures captured in the different views of the same access unit (i.e., within the same time instance) to remove correlation between views. In contrast, conventional inter prediction only uses pictures in different access units as reference pictures.

When a block in a current picture is coded using inter-view prediction, the block has a motion vector that indicates a location in an inter-view reference picture. An inter-view reference picture may be a reference picture that is in the same time instance as a current picture, but is in a different view than the current picture. Thus, when a video coder performs inter-view prediction on a current video unit (such as a macroblock or PU), the video coder may use, as a reference picture, a picture that is in the same access unit as the current video unit, but in a different view.

Hence, in the context of multi-view video coding, there are two kinds of motion vectors. One kind of motion vector is a normal motion vector that points to a temporal reference picture. This type of motion vector may be referred to herein as a temporal motion vector. The type of inter prediction corresponding to a normal, temporal motion vector may be referred to as motion-compensated prediction (MCP). When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

A video coder may use a disparity motion vector of a current block to determine a predictive block for the current block. If the video coder is a video encoder, the video coder may use the predictive block for the current block to generate residual data for the current block. If the video coder is a video decoder, the video coder may use the predictive block for the current block and residual data for the current block to reconstruct a sample block for the current block.

As in 3D-HEVC, the multi-view coding (MVC) extension of H.264/AVC allows inter-view prediction among pictures in the same access unit (i.e., with the same time instance). In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multi-view representation. Consequently, any renderer with a MVC decoder may expect 3D video contents with more than two views. In MVC, when coding a picture in one of the non-base views, a picture may be added into a reference picture list, if the picture is in a different view but in a same time instance. An inter-view reference picture can be put in any position of a reference picture list, just like any inter prediction reference picture.

Figure 3:
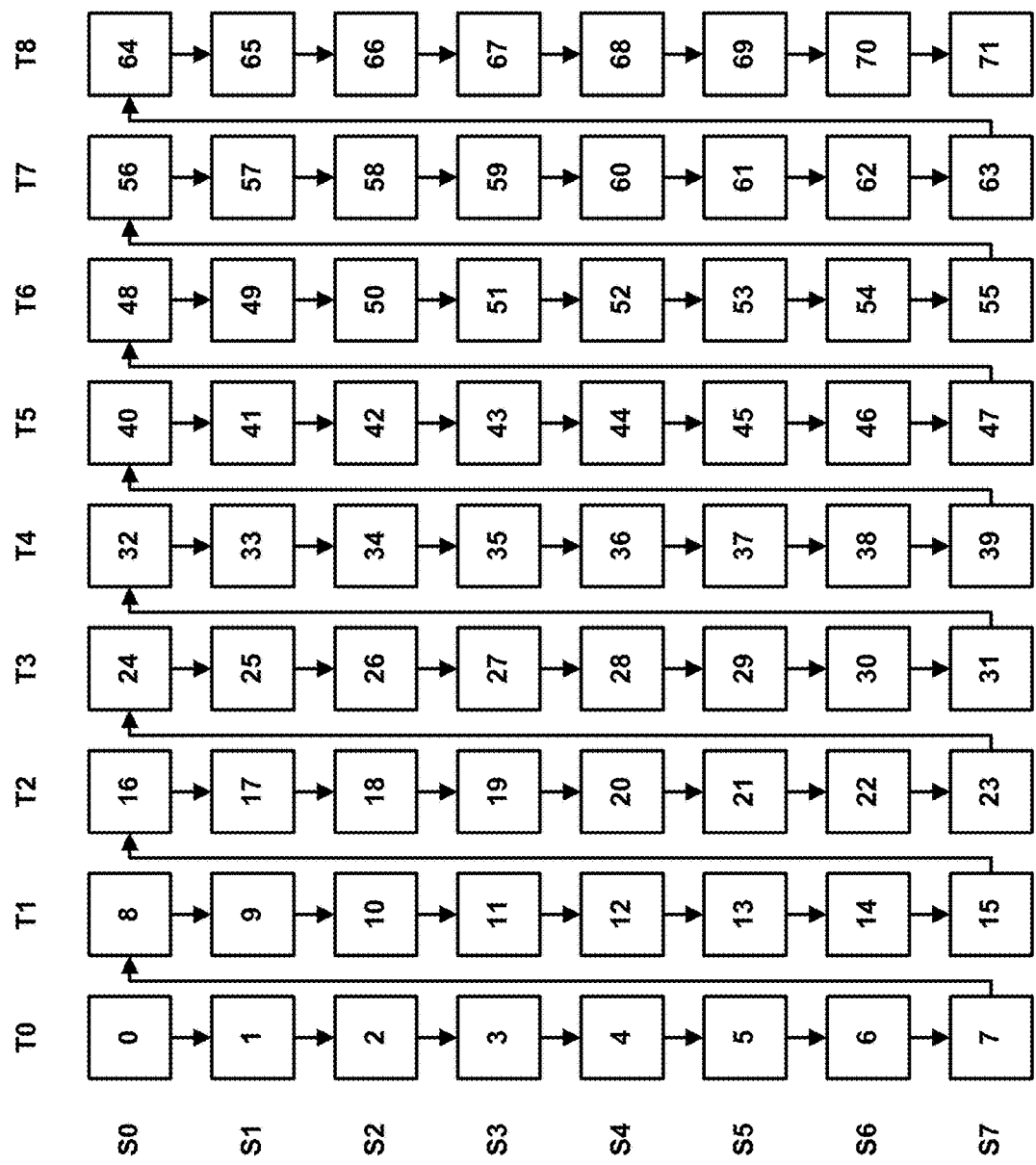
FIG. 3 is a conceptual diagram illustrating an example multi-view decoding order.

FIG. 3 is a conceptual diagram illustrating an example multi-view decoding order. The multi-view decoding order may be a bitstream order. In the example of FIG. 3, each square corresponds to a view component. Columns of squares correspond to access units. Each access unit may be defined to contain the coded pictures of all the views of a time instance. Rows of squares correspond to views. In the example of FIG. 3, the access units are labeled T0 . . . T8 and the views are labeled S0 . . . S7. Because each view component of an access unit is decoded before any view component of the next access unit, the decoding order of FIG. 3 may be referred to as time-first coding. The decoding order of access units may not be identical to the output or display order.

Figure 4:
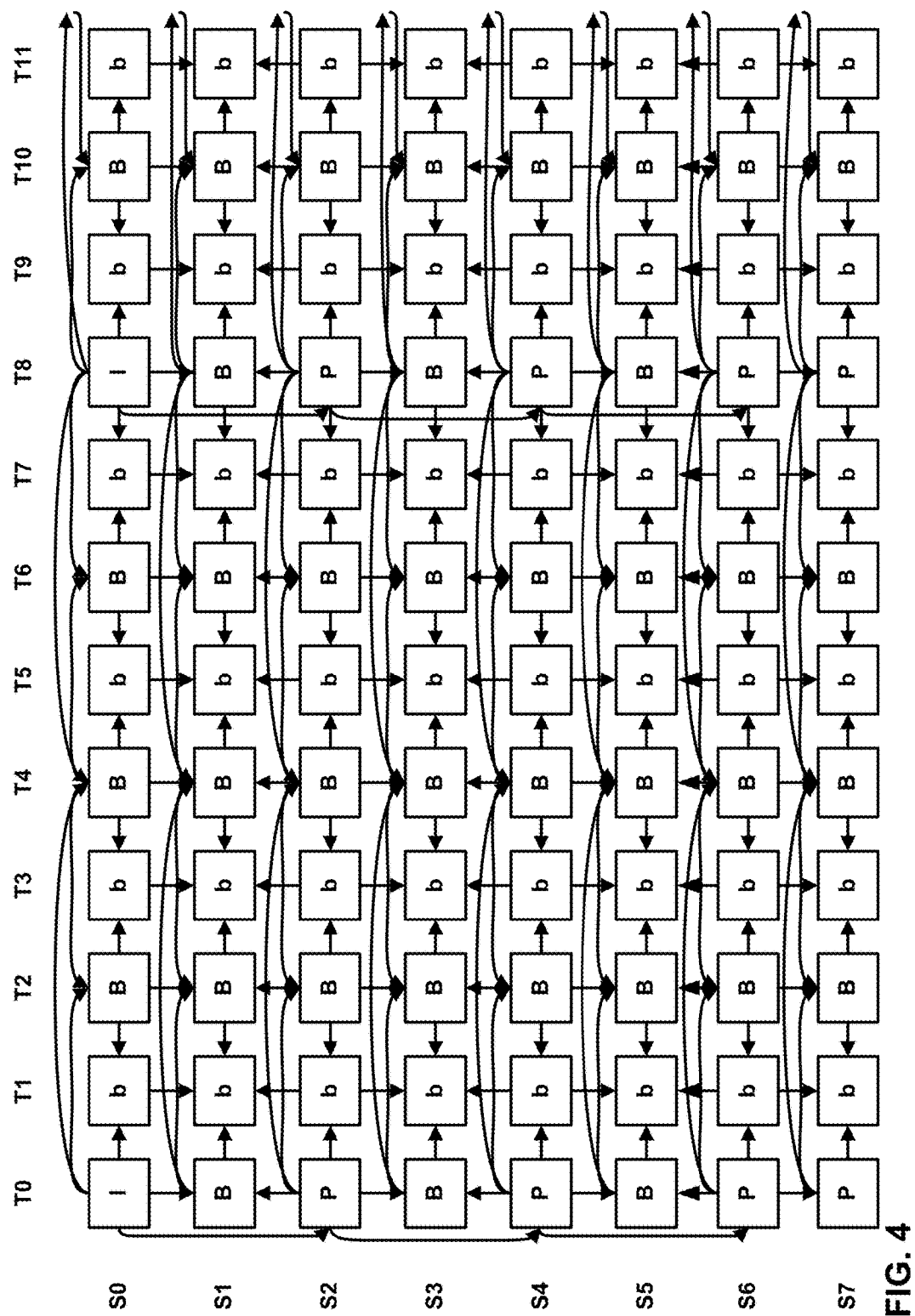
FIG. 4 is a conceptual diagram illustrating an example prediction structure for multi-view coding.

FIG. 4 is a conceptual diagram illustrating an example prediction structure for multi-view coding. The multi-view prediction structure of FIG. 4 includes temporal and inter-view prediction. In the example of FIG. 4, each square corresponds to a view component. In the example of FIG. 4, the access units are labeled T0 . . . T11 and the views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 4, view components in different views of the same access unit may be available as reference pictures. Thus, FIG. 4 shows a typical MVC prediction (including both inter-picture prediction within each view and inter-view prediction) structure for multi-view video coding, where predictions are indicated by arrows, the pointed-to object using the point-from object for prediction reference. The use of one view component of an access unit as a reference picture for another view component of the same access unit may be referred to as inter-view prediction.

In multi-view coding, a bitstream may have a plurality of layers. The layers may correspond to different views. A view may be referred to as a "base view" if a video decoder (e.g., video decoder 30) can decode pictures in the view without reference to pictures in any other view. A view may be referred to as a non-base view if decoding of the view is dependent on decoding of pictures in one or more other views.

In some examples, NAL units may include headers (i.e., NAL unit headers) and payloads (e.g., RBSPs). The NAL unit headers may include nuh_reserved_zero_6 bits syntax elements. NAL units that have nuh_reserved_zero_6 bit syntax elements that specify different values belong to different "layers" of a bitstream. Thus, in multi-view coding, 3DV, or SVC, the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6 bits syntax element may have a non-zero value. As indicated above, in multi-view coding and 3DV coding, different layers of a bitstream may correspond to different views. In SVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer."

NAL units may also include temporal$_{13}$ id syntax elements. The temporal id syntax element of a NAL unit may specify a temporal identifier of the NAL unit. The temporal identifier of a NAL unit may identify a sub-layer with which the NAL unit is associated. Thus, each sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

When coding a picture in one of the non-base views, a video coder (such as video encoder 20 or video decoder 30) may add a picture into a reference picture list if the picture is in a different view than the picture that the video coder is currently coding but is in a same time instance (i.e., access unit) as the picture that the video coder is currently coding. Like other inter prediction reference pictures, the video coder may insert an inter-view prediction reference picture at any position of a reference picture list. In other words, a picture coded with inter-view prediction may be added into a reference picture list for the inter-view prediction of the other non-base views.

Furthermore, a block in a particular picture may have motion information or residual data that are similar to the motion information or residual data of a corresponding block in an inter-view reference picture. Accordingly, the motion information or residual data of a current block in a current picture may be predicted based on motion information or residual data of a corresponding block in an inter-view reference picture. In inter-view residual prediction, a video coder may determine residual blocks of a current CU based on residual data in a different view than the current CU. In order to further improve the coding efficiency, advanced residual prediction (ARP) was proposed in Zhang et al., "3D-CE5.h related: Advanced Residual Prediction for Multiview Coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, JCT3V-B0051) at the 2nd JCT-3V meeting on October 2012.

To further improve coding efficiency, 3D-HEVC has adopted illumination compensation. A basic idea of illumination compensation (IC) is that illumination discrepancies between different views should be corrected in inter-view prediction. Such discrepancies between different views may occur because different cameras may not be perfectly calibrated, potentially resulting in different cameras having different exposure times. As described elsewhere in this disclosure, whether to apply IC or not may be decided at the CU level, and an IC flag is coded for a CU in which inter-view prediction is used. The process to apply IC uses disparity vectors of PUs.

To enable inter-view motion prediction, ARP, and illumination compensation, a video coder may determine disparity vectors for blocks (e.g., PUs, CUs, etc.). In general, a disparity vector is used as an estimator of the displacement between two views. A video coder may use a disparity vector for a block either to locate a reference block in another view for inter-view motion or residual prediction, or the video coder may convert the disparity vector to a disparity motion vector for inter-view motion prediction.

In some examples, the video coder may use the method of Neighboring Blocks Based Disparity Vector (NBDV) to derive a disparity vector for a block. The NBDV derivation process uses disparity motion vectors and implicit disparity motion vectors from spatial and temporal neighboring blocks to derive the disparity vector for the current block. Because neighboring blocks (e.g., blocks that spatially or temporally neighbor the current block) are likely to share almost the same motion and disparity information in video coding, the current block can use the motion vector information in the neighboring blocks as predictors of the disparity vector of the current block.

In general, illumination compensation is a technique for efficiently coding differences in illumination between different views. Illumination compensation was adopted into 3D-HEVC in the $2^{nd}$ JCT-3V meeting on October 2012. As of Dec. 20, 2013, a proposal related to illumination compensation is accessible from: http://phenix.it-sudparis.eu/jct3v/doc_end_user/documents/2_Shanghai/wg11/JCT3V-B0045-v7.zip.

In 3D-HEVC, an illumination compensation (IC) flag is signaled at the CU level. In other words, a syntax structure for a CU may include an illumination compensation flag. Hence, the application of IC is decided at the CU level. If the decoded IC flag is equal to 1, IC is enabled for inter-view predicted PUs within the current CU. The syntax element used for signaling whether IC is applied to the current CU is denoted by 'ic_flag'. The syntax element used for signaling whether illumination compensation is applied to the current CU is conditionally signaled in the CU level.

For each PU of the current CU, if the PU is predicted from a reference picture in RefPicListX (with X equal to 0 or 1) and the reference picture is an inter-view reference picture, the video coder may further filter the prediction signal. In other words, the video coder may apply one or more filters to the predictive blocks of the PUs of the current CU. Each of the one or more filters may have one or more filter coefficients. In some examples, the video coder may derive the filter coefficients for a prediction direction corresponding to RefPicListX by the above row and left column of the CU as well as the corresponding row and column of the reference block in the reference picture in RefPicListX identified by the reference index.

Table 1, below, shows a portion of a coding_unit syntax structure as presented in section G.7.3.9.1 of 3D-HEVC Test Model 2. A coding_unit syntax structure is a syntax structure that contains syntax elements associated with a CU.

TABLE 1

| coding_unit( x0, y0, log2CbSize, ctDepth) { |  |
|---|---|
| ... |  |
| if ( icEnableFlag ) |  |
| ic_flag | u(1) |
| ... |  |

In the syntax tables shown in this disclosure, syntax elements having type descriptors of the form u(n), where n is a non-negative integer, are unsigned values of length n. For instance, the syntax elements with type descriptors u(3) and u(8) are unsigned integers with 3 and 8 bits, respectively.

In Table 1, the ic_flag syntax element equal to 1 specifies that illumination compensation is used for the current CU. The ic_flag syntax element equal to 0 specifies that illumination compensation is not used for the current CU. When the ic_flag syntax element is not present, the ic_flag syntax element may be inferred to be equal to 0.

Furthermore, as shown in Table 1, the ic_flag syntax element is present when the variable icEnableFlag is equal to 1. In other words, the variable icEnableFlag specifies whether the ic_flag syntax element is present in the bitstream. In 3D-HEVC Test Model 2, the variable icEnableFlag is derived as:

icEnableFlag=slice_ic_enable_flag && anyIvRefPic-
Flag            (G-27).

In the equation above, slice_ic_enable_flag is a syntax element signaled in a slice header. The slice_ic_enable_flag syntax element equal to 1 specifies that illumination compensation is enabled for the current slice. The current slice is the slice that includes the current CU. The slice_ic_enable_flag syntax element equal to 0 specifies that illumination compensation is disabled for the current slice. When the slice_ic_enable_flag syntax element is not present, the slice_ic_enable_flag syntax element is inferred to be equal to 0.

In the equation above for determining the value of icEnableFlag, the variable anyIvRefPicFlag specifies whether one or more PUs of the current CU utilize an inter-view reference picture. The variable anyIvRefPicFlag is initially set equal to 0 and derived to be 1 if at least one PU of the current CU utilizes an inter-view reference picture. When the prediction mode of the current CU (i.e., PredMode[x0][y0]) is not equal to MODE_INTRA, the following applies for X being replaced by 0 and 1, and Y being equal to 1−X.

anyIvRefPicFlag=anyIvRefPicFlag||(inter_pred_idc
  [x0][y0] !=Pred_LY && refViewIdxLX[x0][y0]
  !=ViewIdx)||(inter_pred_idc[x0][y1] !=Pred_
  LY && refViewIdxLX[x0][y1] !=ViewIdx)||
  (inter_ pred_idc[x1][y0] !=Pred_LY &&
  refViewIdxLX[x1][y0] !=ViewIdx)||(inter_pre-
  d_idc[x1][y1] !=Pred_LY && refViewIdxLX
  [x1][y1] !=ViewIdx)            (G-26)

In the equation above for determining anyIvRefPicFlag, the variable refViewIdxLX[x][y] (with X being replaced by 0 and 1) is set equal to the view order index of RefPicListLX [RefIdxLX[x][y]]. A view order index is an index that indicates the decoding order of view components in an access unit. Furthermore, in the equation above for determining anyIvRefPicFlag, the variables x1 and y1 specify luma locations relative to the top left sample of the current picture. In 3D-HEVC Test Model 2, the variables x1 and y1 are derived as specified in the following equations.

$$x1 = x0 + ((PartMode == PART\_N \times N || PartMode == PART\_N \times 2N)?$$
$$(nCbs/2):0) + ((PartMode == PART\_nL \times 2N)?(nCbs/4):0) +$$
$$((PartMode == PART\_nR \times 2N)?(3^*nCbs/4):0)(G-23)$$

$$y1 = y0 + ((PartMode == PART\_N \times N || PartMode == PART\_2N \times N)?$$
$$(nCbs/2):0) + ((PartMode == PART\_2N \times nU)?(nCbs/4):0) +$$
$$((PartMode == PART\_2N \times nD)?(3^*nCbs/4):0)(G-24)$$

In the equations above for determining x1 and y1, nCbs indicates a size of the current CU.

In some instances, a video coder may perform CU-level inter-view residual prediction (IVRP) based on a derived disparity vector for each CU. When the video coder performs IVRP for a current CU of a current picture, the video coder may use motion vectors of PUs of the current CU to determine a motion compensated block for the current CU. In other words, the motion compensated block for the current CU may comprise the predictive blocks of the PUs of the current CU. The motion compensated block of the current CU may be denoted as $P_e$. Each sample in a residual block ($r_e$) for the current CU may indicate a difference between a sample in an original coding block of the current CU and a corresponding sample in $P_e$. In addition, the video coder may use a disparity vector of the current CU to determine a disparity reference CU in a reference picture. The reference picture is in a different view than the current picture. A residual block of the disparity reference CU may be denoted as $r_b$. Each sample of the residual block of the disparity reference CU ($r_b$) may indicate a difference between an original sample of a coding block for the disparity reference CU and a corresponding predictive sample in a predictive block for a PU of the disparity reference CU.

Video encoder 20 may include, in the bitstream, data indicating a final residual block. Each sample in the final residual block may indicate a difference between a sample in $r_b$ and a corresponding sample in $r_e$. Therefore, when inter-view residual prediction is used, motion compensation can be expressed by the following equation:

$$\hat{I}_e = r_e + P_e + r_b$$

where the reconstruction of the current block $\hat{I}_e$ equals de-quantized coefficients $r_e$ plus prediction $P_e$ and quantization normalized residual coefficients $r_b$. Video coders may treat $r_b$ as the residual predictor. Thus, similar to motion compensation, $r_b$ may be subtracted from the current residual and only the resulting difference signal is transform coded.

In some examples, video encoder 20 signals an IVRP flag for each CU to indicate whether residual prediction is applied or not. Video encoder 20 may signal the flag to indicate whether IVRP is used on a CU level. When the IVRP flag is equal to 1, IVRP is enabled for a PU with temporal reference pictures in a way that the residual residual prediction signal (i.e., the final residual data) is added in addition to the motion compensated predictor and the signaled residual for this block. The video coder locates the residual signal of the reference block in the reference view (residual prediction signal) based on the derived disparity vector.

The video coder may locate the residual reference region based on a derived disparity vector. In 3D-HEVC Test Model 2, the video coder may use the NBDV derivation process described above to determine the disparity vector. If the video coder is unable to determine a disparity vector for the current CU using the NBDV derivation process, the video coder indicates that the disparity vector for the current CU is unavailable. When the disparity vector for the current CU is unavailable, the bitstream does not include data indicating the IVRP flag and neither video encoder 20 nor video decoder 30 applies inter-view residual prediction to the current CU.

The disparity vector for the current CU may indicate a reference location within an inter-view reference picture. The reference location within the inter-view reference picture may be a top-left corner of a disparity-reference block. The disparity-reference block may have the same size as the current CU. The disparity vector for the current CU may have full-pixel or sub-pixel accuracy. In instances where the disparity vector for the current CU has full-pixel accuracy, the disparity reference block may include samples of the inter-view reference picture. In instances where the disparity vector has sub-pixel accuracy, the video coder may interpolate the samples in the disparity reference block from actual samples in the inter-view reference picture.

Thus, assuming that the left-top position of the current CU is (x, y) and after taking into consideration of a disparity vector denoted by mvDisp, which might be fractionally-accurate, the co-located area of the reference picture, from which the residue is predicted, is represented by the top-left and bottom-right pixel locations:

(x0, y0)=(Max(0, Min((picWidth−1), (x+(mvDisp[0] >>2)), y);
(x1, y1)=(Min((picWidth−1), x0+CUWidth−1), Min ((picHeight−1), y0+CUHeight−1));

wherein mvDisp[0] indicates the horizontal component of the disparity vector, (CUWidth, CUHeight) is the size of the current CU, and picWidth and picHeight is the width and height of the current picture. If none of the PUs in the corresponding inter-view reference block is inter-coded and the values of cbf_luma, cbf_cb and cbf_cr are unequal to 0, the inter-view residual prediction flag is not signaled at the CU-level. In general, cbf_luma, cbf_cb, and cbf_cr indicate whether corresponding transform blocks include non-zero coefficients based on luma, Cb, and Cr samples, respectively.

In one example, the video coder may use the following procedure to derive the residual reference block. In this example, the disparity vector is denoted by mvDisp, with its horizontal and vertical components denoted by mvDisp[0] and mvDisp[1], respectively. Furthermore, in this example, the video coder sets mvDisp[1] (i.e., the vertical component of the disparity vector) to 0. In addition, the video coder locates the corresponding block (e.g., as defined in the example of the previous paragraph). If mvDisp points to an integer position (i.e., mvDisp[0] modulo 4 is equal to 0), the video coder sets the residual prediction signal equal to the residual of the corresponding block. Otherwise, if mvDisp points to a fractional position, the video coder may obtain the residual prediction signal by interpolating the residual samples of the corresponding block using a bi-linear filter.

The syntax element used for signaling whether IVRP is applied to current CU is denoted by 'res_pred_flag.' The res_pred_flag syntax element is conditionally signaled at the CU level. In other words, a syntax structure for a CU (e.g., a coding_unit syntax structure) may include the res_pred_flag syntax element.

Table 2, below, shows a portion of a coding_unit syntax structure as presented in section G.7.3.9.1 of 3D-HEVC Test Model 2 (General coding unit syntax).

TABLE 2

| coding_unit( x0, y0, log2CbSize , ctDepth) { |  |
|---|---|
| . . . |  |
|    if ( resPredEnableFlag ) |  |
|       res_pred_flag | ae(v) |
| . . . |  |

In the syntax tables shown in this disclosure, syntax elements having type descriptors of the form ae(v) are CABAC coded syntax elements. In the example of Table 2, the res_pred_flag syntax element equal to 0 specifies that residual prediction is not used. The res_pred_flag syntax element equal to 1 specifies that residual prediction is used. In 3D-HEVC Test Model 2, when the res_pred_flag syntax element is not present, the value of the res_pred_flag syntax element shall be inferred to be equal to 0.

In Table 2, the res_pred_flag syntax element is present when the variable resPredEnableFlag is equal to 1. In other words, the variable resPredEnableFlag specifies whether the res_pred_flag syntax element is present in the bitstream. In 3D-HEVC Test Model 2, the variable resPredEnableFlag is derived as:

resPredEnableFlag=multi_view_residual_pred_
   flag && PredMode !=MODE_INTRA &&
   residualCbfNonZero && anyTempRefPicFlag     (G-28)

In the equation above, the variable residualCbfNonZero is derived by values of cbf_luma, cbf_cb, cbf_cr and PredMode of the corresponding reference-view transform blocks as follows. The video coder sets the variable residualCbfNonZero to 1 if at least one PU within a corresponding transform block (i.e., at least one PU having a prediction block that is at least partially within one of the corresponding reference-view transform blocks) has both PredMode not equal to MODE_INTRA and if the values of any of cbf_luma, cbf_cb and cbf_cr for corresponding reference-view transform blocks are not equal to 0. Otherwise, the video coder sets residualCbfNonZero equal to 0. The video coder may identify the corresponding reference-view transform blocks based on a location of the current PU and the disparity vector. All the corresponding reference-view transform blocks belong to TUs that are covered or partially covered by a corresponding rectangular area (of the current PU) in the inter-view reference view component, after shifting the PU location with a disparity vector. When the derived disparity vector is unavailable, the video coder may set residualCbfNonZero to 0.

As indicated above, the video coder determines the variable residualCbfNonZero based on cbf_luma, cbf_cb, and cbf_cr. 3D-HEVC Test Model 2 defines the semantics of cbf_luma, cbf_cb, cbf_cr as follows:

cbf_luma[x0][y0][trafoDepth] equal to 1 specifies that the luma transform block contains one or more transform coefficient levels not equal to 0. The array indices x0, y0 specify the location (x0, y0) of the top-left luma sample of the considered transform block relative to the top-left luma sample of the picture. The array index trafoDepth specifies the current subdivision level of a coding block into blocks for the purpose of transform coding. trafoDepth is equal to 0 for blocks that correspond to coding blocks. When cbf_luma[x0][y0][trafoDepth] is not present, cbf_luma[x0][y0][trafoDepth] is inferred to be equal to 1.

cbf_cb[x0][y0][trafoDepth] equal to 1 specifies that the Cb transform block contains one or more transform coefficient levels not equal to 0. The array indices x0, y0 specify the top-left location (x0, y0) of the considered TU. The array index trafoDepth specifies the current subdivision level of a coding block into blocks for the purpose of transform coding. trafoDepth is equal to 0 for blocks that correspond to coding blocks. When cbf_cb[x0][y0][trafoDepth] is not present, the value of cbf_cb[x0][y0][trafoDepth] is inferred as follows. If trafoDepth is greater than 0 and log2TrafoSize is equal to 2, cbf_cb[x0][y0][trafoDepth] is inferred to be equal to cbf_cb[xBase][yBase][trafoDepth−1]. Otherwise, cbf_cb[x0][y0][trafoDepth] is inferred to be equal to 0.

cbf_cr[x0][y0][trafoDepth] equal to 1 specifies that the Cr transform block contains one or more transform coefficient levels not equal to 0. The array indices x0, y0 specify the top-left location (x0, y0) of the considered TU. The array index trafoDepth specifies the current subdivision level of a coding block into blocks for the purpose of transform coding. trafoDepth is equal to 0 for blocks that correspond to coding blocks. When cbf_cr[x0][y0][trafoDepth] is not present, the value of cbf_cr[x0][y0][trafoDepth] is inferred as follows. If trafoDepth is greater than 0 and log2TrafoSize is equal to 2, cbf_cr[x0][y0][trafoDepth] is inferred to be equal to cbf_cr[xBase] [yBase] [trafoDepth−1]. Otherwise, cbf_cr[x0] [y0] [trafoDepth] is inferred to be equal to 0.

Furthermore, as indicated above, the equation for determining resPredEnabledFlag depends on the variable anyTempRefPicFlag. The variable anyTempRefPicFlag specifies whether one or more PUs of the current CU utilize a temporal reference picture. 3D-HEVC Test Model 2 defines the variable anyTempRefPicFlag as follows. The variable anyTempRefPicFlag is initially set equal to 0 and derived to be 1 if at least one PU of the current CU utilizes a temporal reference picture. When PredMode[x0][y0] is not equal to MODE_INTRA, the following applies for X being replaced by 0 and 1, and Y being equal to 1−X.

anyTempRefPicFlag=anyTempRefPicFlag||(inter_pred_idc[x0][y0] !=Pred_LY && refViewIdxLX [x0][y0]==ViewIdx)||(inter_pred_idc[x0][y1] !=Pred_LY && refViewIdxLX[x0][y1] ==ViewIdx)||(inter_pred_idc[x1][y0] !=Pred_LY && refViewIdxLX[x1][y0]==ViewIdx)|| (inter_ pred_idc[x1][y1] !=Pred_LY && refViewIdxLX[x1][y1]==ViewIdx)   (G-25)

In the equation above for determining anyTempRefPicFlag, the variable refViewIdxLX[x][y] (with X being replaced by 0 and 1) is set equal to the view order index of RefPicListLX [RefIdxLX[x][y]]. Furthermore, in the equation above for determining anyTempRefPicFlag, the variables x1 and y1 specify luma locations relative to the top left sample of the current picture. In 3D-HEVC Test Model 2, x1 and y1 are derived as specified in the following:

$x1=x0+((PartMode==PART\_N \times N$||$PartMode==PART\_N \times 2N)$ ? $(nCbs/2):0)+$
$((PartMode==PART\_nL \times 2N)$ ? $(nCbs/4):0)+$
$((PartMode==PART\_nR \times 2N)$ ? $(3*nCbs/4):0)$   (G-23)

$y1=y0+((PartMode==PART\_N \times N$||$PartMode==PART\_2N \times N)$ ? $(nCbs/2):0)+$
$((PartMode==PART\_2N \times nU)$ ? $(nCbs/4):0)+$
$((PartMode==PART\_2N \times nD)$ ? $(3*nCbs/4):0)$   (G-24)

In the equations above for determining x1 and y1, nCbs indicates a size of the current CU.

L. Zhang et al., "3D-CE5.h related: Advanced residual prediction for multiview coding," Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012, document JCT3V-B0051 (hereinafter, "JCT3V-B0051"), proposed an advanced residual prediction (ARP) method to further improve the coding efficiency of inter-view residual prediction. In contrast to the residual prediction scheme described above, ARP may be performed at a PU level instead of a CU level. To distinguish the residual prediction scheme described above from ARP, the residual prediction scheme described above may be referred to as "CU-based inter-view residual prediction."

Figure 5:
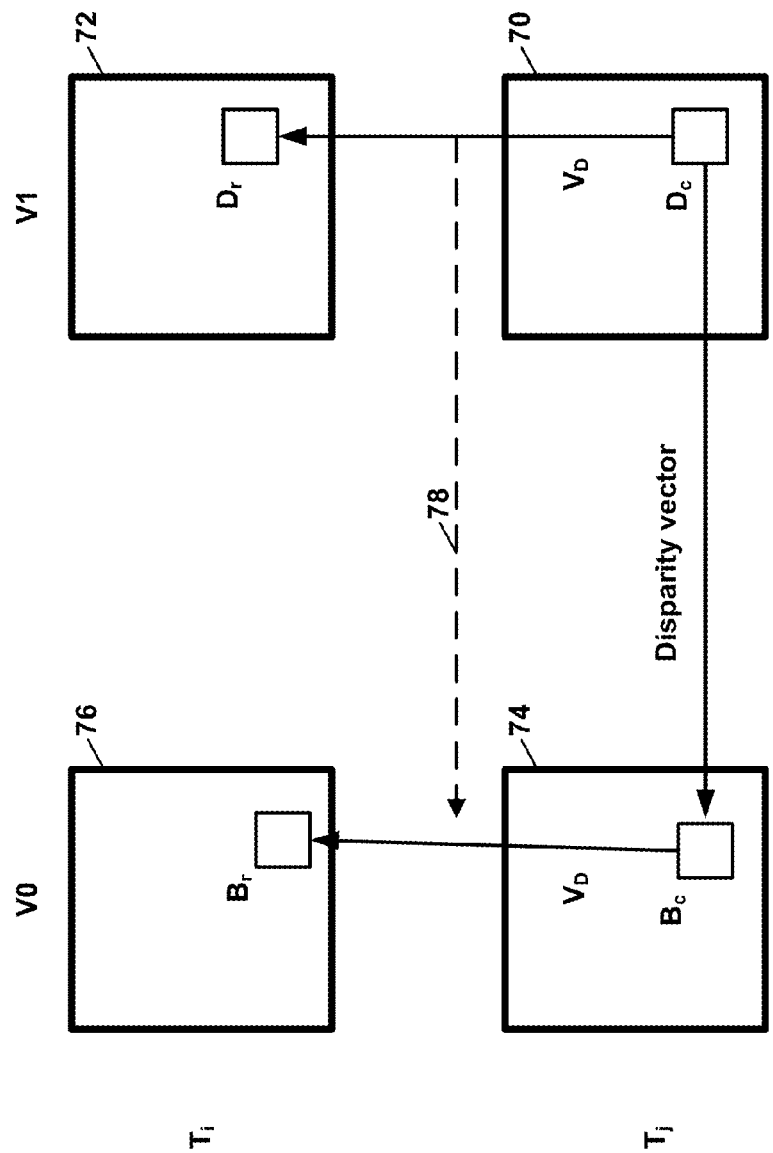
FIG. 5 is a conceptual diagram illustrating an example prediction structure of advanced residual prediction (ARP) in multi-view video coding.

FIG. 5 is a conceptual diagram illustrating an example prediction structure of ARP in multi-view video coding. FIG. 5 includes four pictures: a current picture 70, a temporal reference picture 72, a disparity reference picture 74, and a temporal-disparity reference picture 76. Current picture 70 is in view V1 and is in time instance $T_j$. Temporal reference picture 72 is in view V1 and is in time instance $T_i$. Disparity reference picture 74 is in view V0 and is in time instance $T_j$. Temporal-disparity reference picture 76 is in view V0 and is in time instance $T_i$.

Current picture 70 includes a current PU denoted as "$D_c$". In other words, $D_c$ represents a current block in a current view (view 1). $D_c$ has a temporal motion vector $V_D$ that indicates a location in temporal reference picture 72. Video encoder 20 may determine a temporal reference block $D_r$ based on samples in picture 72 that are associated with the location indicated by the temporal motion vector $V_D$. Thus, $D_r$ denotes $D_c$'s temporal prediction block from the same view (view 1) at time $T_i$ and $V_D$ denotes the motion from $D_c$ to $D_r$.

Furthermore, video encoder 20 may determine a disparity reference block $B_c$ based on samples in disparity reference picture 74 that are associated with a location indicated by a disparity vector of $D_c$. Thus, $B_c$ denotes a reference block (i.e., the representation of $D_c$ in the reference view (view 0) at time $T_a$). The top-left position of $B_c$ can be calculated with the derived disparity vector by adding the derived disparity vector to the top-left position of $D_c$. Since $D_c$ and $B_c$ may be projections of the same object in two different views, $D_c$ and $B_c$ should share the same motion information. Therefore, $B_c$'s temporal prediction block $B_r$ in view 0 at time $T_i$ can be located from $B_c$ by applying the motion information of $V_D$.

Video encoder 20 may determine a temporal-disparity reference block $B_r$ (the predictive block of $B_c$) in temporal-disparity picture 76. As indicated above, temporal-disparity picture 76 is in the same view (i.e., view V 0) as $B_r$ and is in the same time instance as $D_r$ (i.e., time instance $T_i$). Video encoder 20 may determine $B_r$ based on samples at a location indicated by the motion vector $V_D$ of $D_c$. Thus, the top-left position of $B_r$ can be calculated with the re-used motion vector $V_D$ by adding the motion vector $V_D$ to the top-left position of $B_c$. The top-left position of $B_c$ can be equal to the sum of the top-left position of $D_c$ and the disparity vector. Thus, the top-left position of $B_r$ may be equal to the sum of the coordinates of the top-left position of $D_c$, the disparity vector, and the motion vector $V_D$. In this way, as shown in FIG. 5 by arrow 78, video encoder 20 may re-use the motion vector $V_D$ for determining $B_r$.

Furthermore, in ARP, each sample in a first residual block may indicate the difference between a sample in $D_c$ and a corresponding sample of $D_r$. The first residual block may be referred to as an original residual block for D. Each sample in a second residual block may indicate a difference between a sample in $B_c$ and a corresponding sample in $B_r$. The second residual block may be referred to as a "residual predictor." Because video encoder 20 uses the motion vector $V_D$ to determine $B_r$, the residual predictor may be different than the actual residual data of $B_c$.

After video encoder 20 determines the residual predictor, video encoder 20 may multiply the residual predictor by a weighting factor. In other words, the residual of $B_c$ with motion information of $V_D$ is multiplied by a weighting factor and used as the residual predictor for the current residual. The weighting factor may be equal to 0, 0.5, or 1. Thus, three weighting factors may be used in ARP (i.e., 0, 0.5, and 1). After video encoder 20 multiplies the residual predictor by the weighting factor, the residual predictor may be referred to as a weighted residual predictor. Video encoder 20 may select, as a final weighting factor, the weighting factor that leads to a minimal rate-distortion cost for the current CU (i.e., the CU containing the current PU). Video encoder 20 may include, in the bitstream, at a CU level, data indicating a weighting index. The weighting index may indicate the final weighting factor (i.e., the weighting factor that was used to generate the weighted residual predictor) for the current CU. In some examples, weighting indexes of 0, 1, and 2 correspond to weighting factors of 0, 1, and 0.5, respectively. Selection of the weighting factor of 0 for the current CU is equivalent to not using ARP for any of the PUs of the current CU.

Video encoder 20 may then determine a final residual block for the current PU. Each sample in the final residual block for the current PU may indicate a difference between a sample in the original residual block and a corresponding sample in the weighted residual predictor. A residual block of a current CU (i.e., the CU containing the current PU) may include the final residual block for the current PU along with residual blocks, if any, for other PUs of the current CU. As described elsewhere in this disclosure, video encoder 20 may partition the residual block of the current CU among one or more transform blocks. Each of the transform blocks may be associated with a TU of the current CU. For each transform block, video encoder 20 may apply one or more transforms to the transform block to generate a transform coefficient block. Video encoder 20 may include, in a bitstream, data that represent quantized transform coefficients of the transform coefficient block.

Hence, in ARP, to ensure high correlation between residues of two views, video encoder 20 may apply motion of a current PU to a corresponding block in a reference view picture to generate a residual in the base view to be used for inter-view residual prediction. In this way, the motion is aligned for the current PU and the corresponding reference block in the reference view. Moreover, an adaptive weighting factor is applied to the residue signal so that the prediction error is further reduced.

If the current PU is bi-predicted, the current PU has a RefPicList0 motion vector, a RefPicList1 motion vector, a RefPicList0 reference index, and a RefPicList1 reference index. This disclosure may refer to the reference picture indicated by the current PU's RefPicList0 reference index as the current PU's RefPicList0 target reference picture. The current PU's RefPicList1 motion vector may indicate a reference location in the current PU's RefPicList1 target reference picture. This disclosure may refer to the reference picture indicated by the current PU's RefPicList1 reference index as the current PU's RefPicList1 target reference picture. The current PU's RefPicList1 motion vector may indicate a reference location in the current PU's RefPicList1 target reference picture.

Hence, when video encoder 20 performs ARP on a bi-predicted PU, video encoder 20 may determine, based on the current PU's RefPicList0 motion vector, a reference location in the current PU's RefPicList0 target reference picture. This disclosure may refer to this reference location as the current PU's RefPicList0 reference location. Video encoder 20 may then determine a reference block that includes actual or interpolated samples of the current PU's RefPicList0 target reference picture that are associated with the current PU's RefPicList0 reference location. This disclosure may refer to this reference block as the current PU's RefPicList0 reference block.

In addition, video encoder 20 may determine, based on the current PU's RefPicList1 motion vector, a reference location in the current PU's RefPicList1 target reference picture. This disclosure may refer to this reference location as the current PU's RefPicList1 reference location. Video encoder 20 may then determine a reference block that includes actual or interpolated samples of the current PU's RefPicList1 target reference picture that are associated with the current PU's RefPicList0 reference location. This disclosure may refer to this reference block as the current PU's RefPicList1 reference block.

Video encoder 20 may determine, based on the current PU's RefPicList0 reference block and the current PU's RefPicList1 reference block, a temporal predictive block for the current PU. For example, each sample in the current PU's temporal predictive block may indicate a weighted average of corresponding samples in the current PU's RefPicList0 reference block and the current PU's RefPicList1 reference block.

Furthermore, when video encoder 20 performs ARP on a bi-predicted PU, video encoder 20 may determine, based on the current PU's RefPicList0 motion vector and a location within a disparity reference frame of a disparity reference block, a temporal-disparity reference location in a temporal-disparity reference picture. This disclosure may refer to this temporal-disparity reference location and this temporal-disparity reference picture as the RefPicList0 temporal-disparity reference location and the RefPicList0 temporal-disparity reference picture, respectively. The RefPicList0 temporal-disparity reference picture may have the same POC value as the current PU's RefPicList0 target reference picture. Video encoder 20 may then determine a sample block that includes actual or interpolated samples of the RefPicList0 temporal-disparity reference picture that are associated with the RefPicList0 temporal-disparity reference location. This disclosure may refer to this sample block as the RefPicList0 temporal-disparity reference block.

In addition, video encoder 20 may determine, based on the current PU's RefPicList1 motion vector and the location within the disparity reference frame of the disparity reference block, a temporal-disparity reference location in a temporal-disparity reference picture. This disclosure may refer to this temporal-disparity reference location and this temporal-disparity reference picture as the RefPicList1 temporal-disparity reference location and the RefPicList1 temporal-disparity reference picture, respectively. The RefPicList1 temporal-disparity reference picture may have the same POC value as the current PU's RefPicList1 target reference picture. Because the current PU's RefPicList0 target reference picture and the current PU's RefPicList1 target reference picture may be different, the RefPicList1 temporal-disparity reference picture may be different than the RefPicList0 temporal-disparity reference picture. Video encoder 20 may then determine a sample block that includes actual or interpolated samples of the RefPicList1 temporal-disparity reference picture that are associated with the RefPicList1 temporal-disparity reference location. This disclosure may refer to this sample block as the RefPicList1 temporal-disparity reference block.

Next, video encoder 20 may determine, based on the RefPicList0 temporal-disparity reference block and the RefPicList1 temporal-disparity reference block, a disparity predictive block. In some examples, each sample in the disparity predictive block is a weighted average of corresponding samples in the RefPicList0 temporal-disparity reference block and the RefPicList1 temporal-disparity reference block. Video encoder 20 may then determine a residual predictor. The residual predictor may be a block of samples. Each sample in the residual predictor may indicate a difference between a sample in the disparity reference block and a corresponding sample in the disparity predictive block. Video encoder 20 may then generate a weighted residual predictor by applying a weighting factor to the residual predictor. Video encoder 20 may then determine a final residual block for the current PU. Each sample in the current PU's final residual block may indicate a difference between a sample in the original prediction block for the current PU and corresponding samples in the current PU's temporal predictive block and the weighted residual predictor. Video encoder 20 may signal the current PU's final residual block in the bitstream.

Video decoder 30 may perform a similar process when performing ARP on a bi-predicted PU. For instance, video decoder 30 may determine the current PU's temporal predictive block and the weighted residual predictor in the sample manner described above. Video decoder 30 may determine the current PU's final residual block based on elements signaled in the bitstream. Video decoder 30 may then reconstruct the current PU's prediction block by adding the current PU's final residual block, the current PU's temporal predictive block, and the weighted residual predictor.

Figure 6:
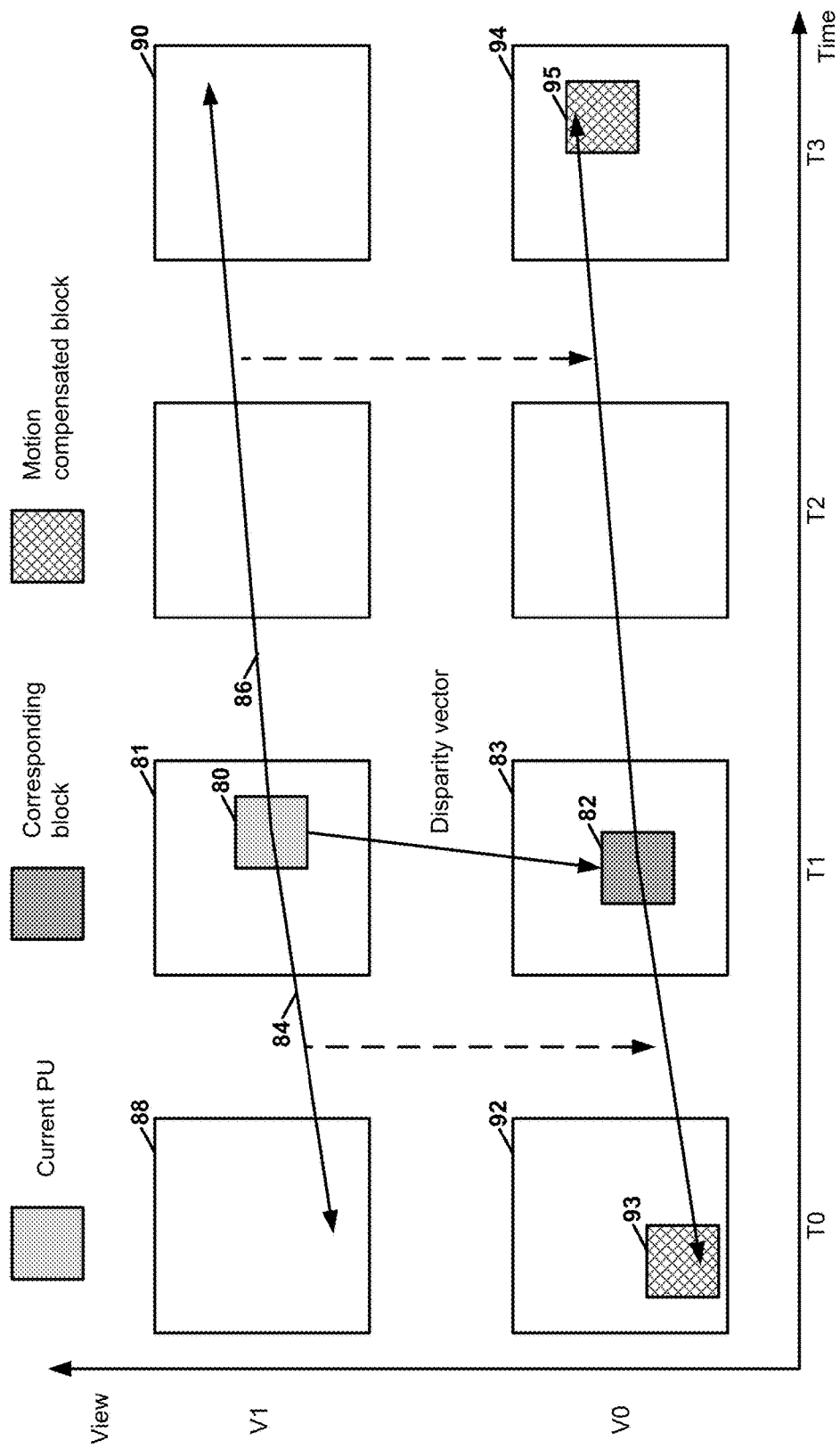
FIG. 6 is a conceptual diagram illustrating an example relationship among a current block, a reference block, and a motion compensated block.

FIG. 6 is a conceptual diagram illustrating an example relationship among a current block, a reference block, and a motion compensated block. In the example of FIG. 6, a video coder is currently coding a current PU 80 in a current picture 81. Current picture 81 is associated with a view V1 and a time instance T1.

Furthermore, in the example of FIG. 6, the video coder may determine a reference block 82 (i.e., a corresponding block) that comprises actual or interpolated samples of a reference picture 83 that are associated with a location indicated by a disparity vector of current PU 80. For instance, a top-left corner of reference block 82 may be the location indicated by the disparity vector of current PU 80. Temporal-disparity reference block 95 may have the same size as the prediction block of current PU 80.

In the example of FIG. 6, current PU 80 has a first motion vector 84 and a second motion vector 86. Motion vector 84 indicates a location in temporal reference picture 88. Temporal reference picture 88 is in view V1 (i.e., the same view as current picture 81) and a time instance T0. Motion vector 86 indicates a location in temporal reference picture 90. Temporal reference picture 90 is in view V1 and a time instance T3.

In accordance with the ARP scheme described above, the video coder may determine a reference picture (i.e., reference picture 92) that is in the same view as reference picture 83 and is in the same time instance as temporal reference picture 88. In addition, the video coder may add motion vector 84 to coordinates of a top-left corner of reference block 82 to derive a temporal-disparity reference location. The video coder may determine a temporal-disparity reference block 93 (i.e., a motion compensated block). Samples in temporal-disparity reference block 93 may be actual or interpolated samples of reference picture 92 that are associated with the temporal-disparity reference location derived from motion vector 84. Temporal-disparity reference block 93 may have the same size as the prediction block of current PU 80.

Similarly, the video coder may determine a reference picture (i.e., reference picture 94) that is in the same view as reference picture 84 and is in the same time instance as temporal reference picture 90. In addition, the video coder may add motion vector 86 to coordinates of the top-left corner of reference block 82 to derive a temporal-disparity reference location. The video coder may then determine a temporal-disparity reference block 95 (i.e., a motion compensated block). Samples in temporal-disparity reference block 95 may be actual or interpolated samples of reference picture 94 that are associated with the temporal-disparity reference location derived from motion vector 86. Temporal-disparity reference block 95 may have the same size as the prediction block of current PU 80.

Furthermore, in the example of FIG. 6, the video coder may determine, based on temporal-disparity reference block 93 and temporal-disparity reference block 95, a disparity predictive block. The video coder may then determine a residual predictor. Each sample in the residual predictor may indicate a difference between a sample in reference block 82 and a corresponding sample in the disparity predictive block.

As indicated above, residual prediction may involve the use of a weighting factor and a weighting factor index. In the following discussion, the syntax element used for signaling the weighting factor indices is denoted by 'weighting_factor_index.' The weighting_factor_index syntax element is conditionally signaled in the CU level. Detailed information of the syntax element and the associated semantics are described below.

Table 3, below, shows a portion of an example coding_unit syntax structure. In Table 3 and other syntax tables of this disclosure, underlined text indicates text added to 3D-HEVC Test Model 2.

TABLE 3

| coding_unit( x0, y0, log2CbSize , ctDepth) { | Descriptor |
|---|---|
|     if( transquant_bypass_enable_flag ) { | |
|         cu_transquant_bypass_flag | ae(v) |
|     } | |
| ... | |
|     } else { /* PART_NxN */ | |
| ... | |
|         prediction_unit( x1, y1 , log2CUSize ) | |
|     } | |
|     if ( !depth_flag && layer_id && PredMode!= MODE_INTRA && PartMode == PART_2Nx2N ) | |
|         weighting_factor_index | ae(v) |
| ... | |
|     if( !pcm_flag ) { | |
| ... | |
| } | |

When the weighting_factor_index syntax element is not present in the bitstream, the weighting factor is inferred to be equal to 0. As shown in Table 3, the weighting_factor_index syntax element may be signaled only when all of the following conditions are satisfied: the current view is the dependent texture view, the current CU is not intra-coded, and the partition mode of the current CU is equal to PART_2Nx2N.

Table 4, below, shows a portion of an example coding_unit syntax structure.

TABLE 4

| coding_unit( x0, y0, log2CbSize , ctDepth) { | Descriptor |
|---|---|
|     if( transquant_bypass_enable_flag ) { | |
|         cu_transquant_bypass_flag | ae(v) |
|     } | |
| ... | |
|     } else { /* PART_NxN */ | |
| ... | |
|         prediction_unit( x1, y1 , log2CUSize ) | |
|     } | |
|     if ( !depth_flag && layer_id && PredMode!= MODE_INTRA && PartMode == PART_2Nx2N && TempMVAvai && DispVectAvai ) | |
|         weighting_factor_index | ae(v) |
| ... | |
|     if( !pcm_flag ) { | |
| ... | |
| } | |

In the example of Table 4, the weighting_factor_index syntax element indicates an index to the weighting factor used for advanced residual prediction. When the weighting_factor_index syntax element is not present, advanced residual prediction is disabled for the current CU. If the weighting factor is equal to 0, the residual of the current block is coded using the transform coding described in HEVC Working Draft 9, and the specifications in subclause 8.5.2.2 of HEVC Working Draft 9 is invoked to get the prediction samples. Otherwise, the current residual signal is predicted using the potentially interpolated reference residual signal multiplied by the weighting factor and only the difference is transmitted. For each prediction list where the temporal reference picture is utilized, the residual predictor may be generated on the fly.

When the weighting_factor_index syntax element is not present in the bitstream, the weighting factor is inferred to be equal to 0. Furthermore, in the example of Table 4, the weighting_factor_index syntax element is signaled only when all of the following conditions are satisfied: the current view is a dependent texture view; the current CU is not intra-coded and a partition mode of the current CU is equal to PART_2Nx2N, the derived disparity vector is available, and at least one partition has a temporal motion vector (i.e., the reference picture is from the same view). In Table 4, TempMVAvai set equal to 1 indicates the current CU is predicted from at least one reference picture from the same view. Otherwise, TempMVAvai is set equal to 0. Furthermore, in Table 4, DispVectAvai is equal to 1 if a disparity vector could be found. Otherwise, DispVectAvai is equal to 0.

In other examples, the weighting_factor_index syntax element may be signaled only when all of the following conditions are satisfied: the current view is the dependent texture view, the derived disparity vector is available, at least one partition in all PUs of the current CU has a temporal motion vector (i.e., the reference picture is from the same view). As before, when the weighting_factor_index syntax element is not present in the bitstream, the weighting factor is inferred to be equal to 0.

There may be several parsing problems in the above-described design of inter-view residual prediction and illumination compensation in HEVC-based multi-view/3DV coding (i.e., 3D-HEVC and MV-HEVC). For example, in the above-described 3D-HEVC design, when parsing a syntax element (e.g., the ic_flag syntax element or the res_pred_flag syntax element) in a CU, the video coder may need to determine whether the CU utilizes one or more inter-view reference pictures. However, determining whether a CU uses an inter-view reference picture may require construction of a merge or AMVP candidate list. Therefore, the parsing process (i.e., the process of obtaining syntax elements from a bitstream) is dependent on the decoding process (i.e., the process of reconstructing sample blocks based on syntax elements), resulting in low throughput. Hence, a portion of the parsing process cannot proceed until a particular portion of the decoding process is complete.

In another example problem in the above-described 3D-HEVC design, parsing a syntax element (e.g., res_pred_flag) in a CU depends on the results of the disparity derivation process. For instance, as described above, the res_pred_flag syntax element is present when the variable resPredEnableFlag is equal to 1. Furthermore, as described above, determining whether the variable resPredEnableFlag is equal to 1 requires determining a disparity vector. Determining the disparity vector is part of a decoding process, not the parsing process. Therefore, the parsing process is dependent on the decoding process, again resulting in low throughput.

Furthermore, in another example problem in the above-described 3D-HEVC design, in order to determine whether a bitstream includes an ic_flag syntax element, the video coder may need to determine whether any PU of the current CU uses an inter-view reference picture. Determining whether the current CU uses one or more inter-view reference requires the video coder to determine, for each PU of the current CU, whether the PU uses one or more inter-view reference pictures. The video coder may need to parse and decode a PU in order to determine whether the PU uses one or more inter-view reference pictures. Therefore, parsing all PUs inside the current CU is required for the parsing of the current CU. Therefore, the parsing process of a CU-level syntax element is dependent on decoded PU-level syntax, which might not be desirable.

In yet another example problem in the above-described 3D-HEVC design, when parsing a syntax element (e.g., the res_pred_flag syntax element), the parsing process is dependent on decoded information of other views (e.g., checking the value of the cbf_luma, accessing the coding modes, checking the motion vectors of a reference block in a reference view, etc.). Therefore, the loss of the required information in other views leads to the failure of entropy decoding of all following slices in the current view.

The techniques of this disclosure may solve the parsing problems in 3D-HEVC mentioned above. For example, the signaling of one syntax element, such as ic_flag and res_pred_flag, checking of conditions related to the motion information, such as whether the current CU uses inter-view reference picture (as one entry in a reference picture list) are avoided, in order to make the parsing of the syntax element independent of the decoding process. Furthermore, in some examples, the video coder may avoid the need to check the availability of a disparity vector when determining whether a particular syntax element (e.g., res_pred_flag) is signaled.

Furthermore, in some example techniques of this disclosure, when determining whether a particular syntax element (e.g., res_pred_flag) is present in the bitstream, the video coder may avoid checking of conditions related to the decoded information of other views (e.g., such as whether there is at least one PU in the reference block is coded as inter mode, or the values of either cbf_luma, cbf_cb or cbf_cr are unequal to 0). This may make the parsing of the particular syntax element independent of other views.

In some example techniques of this disclosure, constraints may be introduced at the decoder side regarding the above relevant syntax elements (i.e., ic_flag, res_pred_flag, and weighting_factor_index). For example, if none of the PUs in the corresponding block is inter-coded and the values of cbf_luma, cbf_cb and cbf_cr are not equal to 0, a constraint may require that the res_pred_flag syntax element shall be 0. In another example, if the disparity vector of the current CU is unavailable, a constraint may require that the res_pred_flag syntax element and/or the weighting_factor_index syntax element shall be 0. In another example, when the disparity vector is unavailable, a constraint may require that a zero disparity vector be used to locate the reference block. Furthermore, in one example, if none of PUs of the current CU utilizes a temporal reference picture, a constraint may require that the res_pred_flag syntax element and the weighting_factor_index syntax element shall be 0. In another example, if none of PUs of the current CU utilizes an inter-view reference picture, a constraint may require that the ic_flag syntax element shall be 0.

Thus, in accordance with one or more examples of this disclosure, video encoder 20 may generate a bitstream that conforms to a video coding standard. The bitstream may comprise a coded representation of the video data. The bitstream may include data indicating a weighting factor index for a current CU. Furthermore, the video coding standard may require the weighting factor index for the current CU to have a particular value (e.g., 0) when no partition of the current CU has a temporal motion vector or a disparity vector of the current CU is unavailable. In such examples, the weighting factor index for the current CU being equal to the particular value indicates that residual prediction is not applied with regard to the current CU. In some examples, video encoder 20 may determine a reference residual signal and determine final residual data for the current CU using the reference residual signal and the weighting factor. Video encoder 20 may output the bitstream.

In a similar example, video encoder 20 may determine whether current view is a dependent texture view, whether a current CU is not intra coded, and whether a partitioning mode of the current CU is equal to PART_2N×2N. Responsive to determining that the current view is a dependent texture view, the current CU is not intra coded, and the partitioning mode of the current CU is equal to PART_2N×2N, video encoder 20 may include, in a bitstream that comprises an encoded representation of the video data, data indicating a weighting factor index for the current CU. The current CU is in a picture belonging to the current view. However, responsive to determining that the current view is not a dependent texture view, or the current CU is not intra coded, or the partitioning mode of the current CU is not equal to PART_2N×2N, video encoder 20 may omit, from the bitstream, the data indicating the weighting factor index for the current CU. In either case, video encoder 20 may output the bitstream. Furthermore, in this example, the bitstream may conform to a video coding standard that subjects the weighting factor index to a constraint that requires the weighting factor index for the current CU to have a particular value when no partition of the current CU has a temporal motion vector or a disparity vector of the current CU is unavailable. The weighting factor index for the current CU being equal to the particular value indicates that residual prediction is not applied with regard to the current CU.

Similarly, in some examples of this disclosure, video decoder 30 may obtain, from a bitstream that conforms to a video coding standard (e.g., HEVC or its extensions), a weighting factor index for a current CU. In such examples, the bitstream comprises an encoded representation of the video data and the video coding standard subjects the weighting factor index for the current CU to a constraint that requires the weighting factor index for the current CU to have a particular value when no partition of the current CU has a temporal motion vector or a disparity vector of the current CU is unavailable. The weighting factor index for the current CU having the particular value indicates that residual prediction (e.g., ARP) is not applied with regard to the current CU. In some examples, the weighting factor index syntax element being equal to 0 indicates that residual prediction is not applied with regard to the current CU. Furthermore, in such examples, video decoder 30 may determine a weighting factor based on the weighting factor index for the current CU. For instance, if the weighting factor index is 0, 1, or 2, video decoder 30 may determine that the weighting factor is 0, 0.5 or 1, respectively. In such examples, video decoder 30 may determine, based on the weighting factor, whether to predict a residual signal for the current CU.

In a similar example, video decoder 30 may determine whether a current view is a dependent texture view, whether a current CU is not intra coded, and whether a partitioning mode of the current CU is equal to PART_2N×2N. When the current view is a dependent texture view, the current CU is not intra coded, and the partitioning mode of the current CU is equal to PART_2N×2N, video decoder 30 may obtain, from a bitstream that comprises an encoded representation of the video data, a weighting factor index for the current CU. The current CU is in a picture belonging to a current view. When the current view is not a dependent texture view, or the current CU is intra coded, or the partitioning mode of the current CU is not equal to PART_2N×2N, video decoder 30 may assume that the weighting factor index is equal to a particular value that indicates that residual prediction is not applied with regard to the current CU. In addition, video decoder 30 may determine a weighting factor based on the weighting factor index for the current CU. Video decoder 30 may also determine, based on the weighting factor, whether to predict a residual signal for the current CU. In this example, the bitstream may conforms to a video coding standard that subjects the weighting factor index for the current CU to a constraint that requires the weighting factor index for the current CU to be equal to the particular value when no partition of the current CU has a temporal motion vector or a disparity vector of the current CU is unavailable.

As described above, predicting a residual signal for the current CU is a step in performing residual prediction (e.g., ARP). In order to predict the residual signal for the current CU, video decoder 30 may determine a temporal motion vector for a PU of the current CU and may determine a disparity vector for the current CU. Video decoder 30 may use the disparity vector to determine a disparity reference block in a disparity reference picture. In addition, video decoder 30 may use the temporal motion vector and the disparity vector to determine a temporal disparity reference block in a temporal disparity reference picture. Video decoder 30 may then determine the residual signal (i.e., the residual predictor) based on differences between the disparity reference block and the temporal disparity reference block. Video decoder 30 may multiply the residual predictor by the weighting factor to determine a modified residual predictor for use in reconstructing coding blocks of the current CU.

Figure 7:
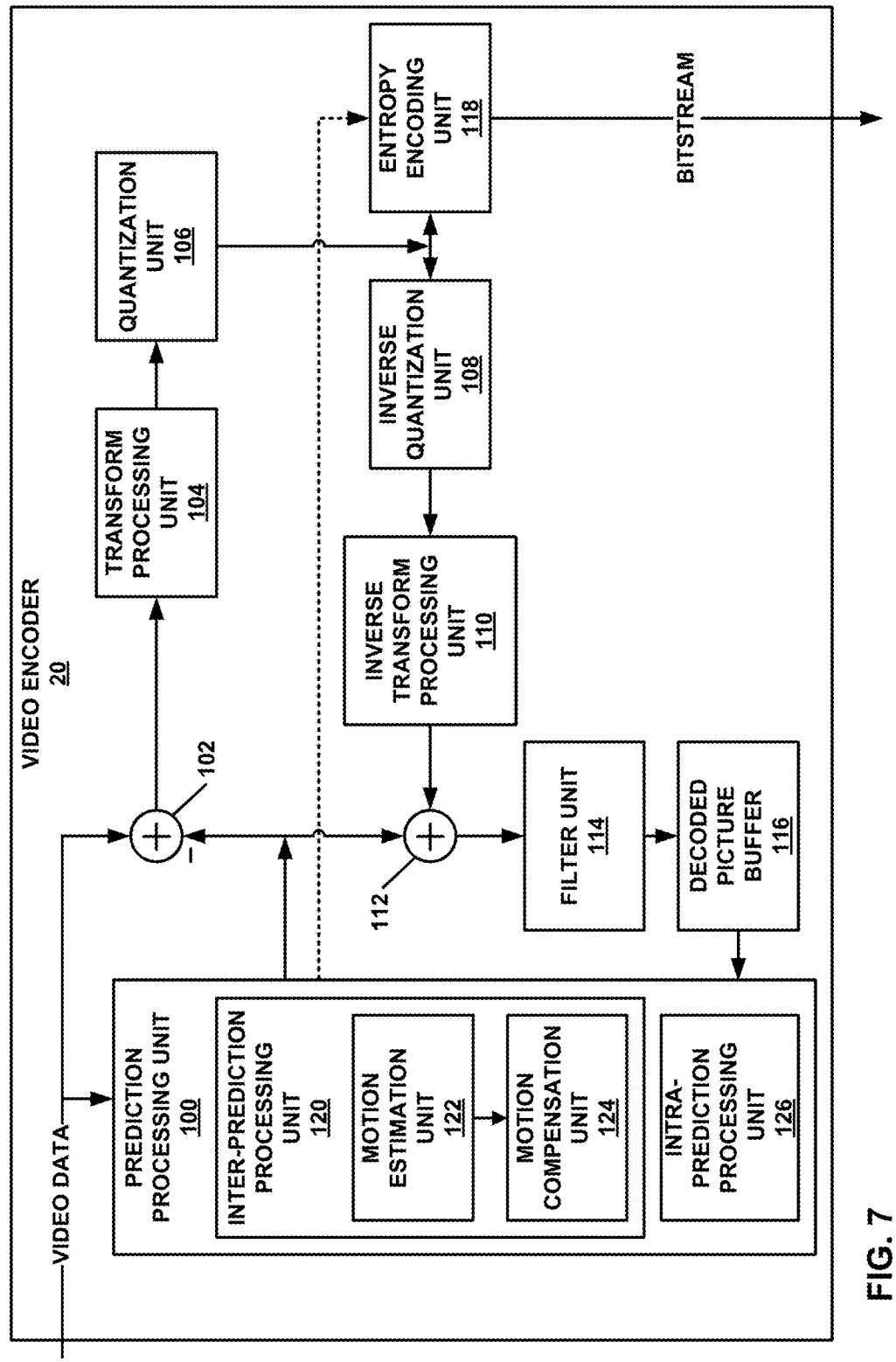
FIG. 7 is a block diagram illustrating an example video encoder that may implement the techniques described in this disclosure.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 7, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB of a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks of the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Furthermore, in some examples, inter-prediction processing unit 120 may perform inter-view residual prediction with regard to a current block. For instance, inter-prediction processing unit 120 may determine a residual predictor for the current block as described elsewhere in this disclosure. Residual generation unit 102 may use a disparity vector to determine, based on samples of a disparity reference picture, a residual signal for the current CU. Residual generation unit 102 may modify, based on the weighting factor for the current CU, the residual signal. Residual generation unit 102 may then determine a final residual block for the current CU. Each sample in a final residual block for the current CU may be equal to a value of a corresponding sample in a coding block for the current CU, minus a value of a corresponding sample in the modified residual signal, minus a value of a corresponding sample in a predictive block for a PU of the current CU. Video encoder 20 may generate a weighting factor index syntax element that indicates a value of the weighting factor for the current CU. In accordance with some examples of this disclosure, a constraint requires the weighting factor index syntax element for the current CU to be equal to a particular value (e.g., 0) when the no PU of the current CU has a temporal motion vector or a disparity vector of the current CU is unavailable.

Transform processing unit 104 may perform quad-tree partitioning to partition the residual blocks (i.e., the modified final residual blocks) of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information; thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Figure 8:
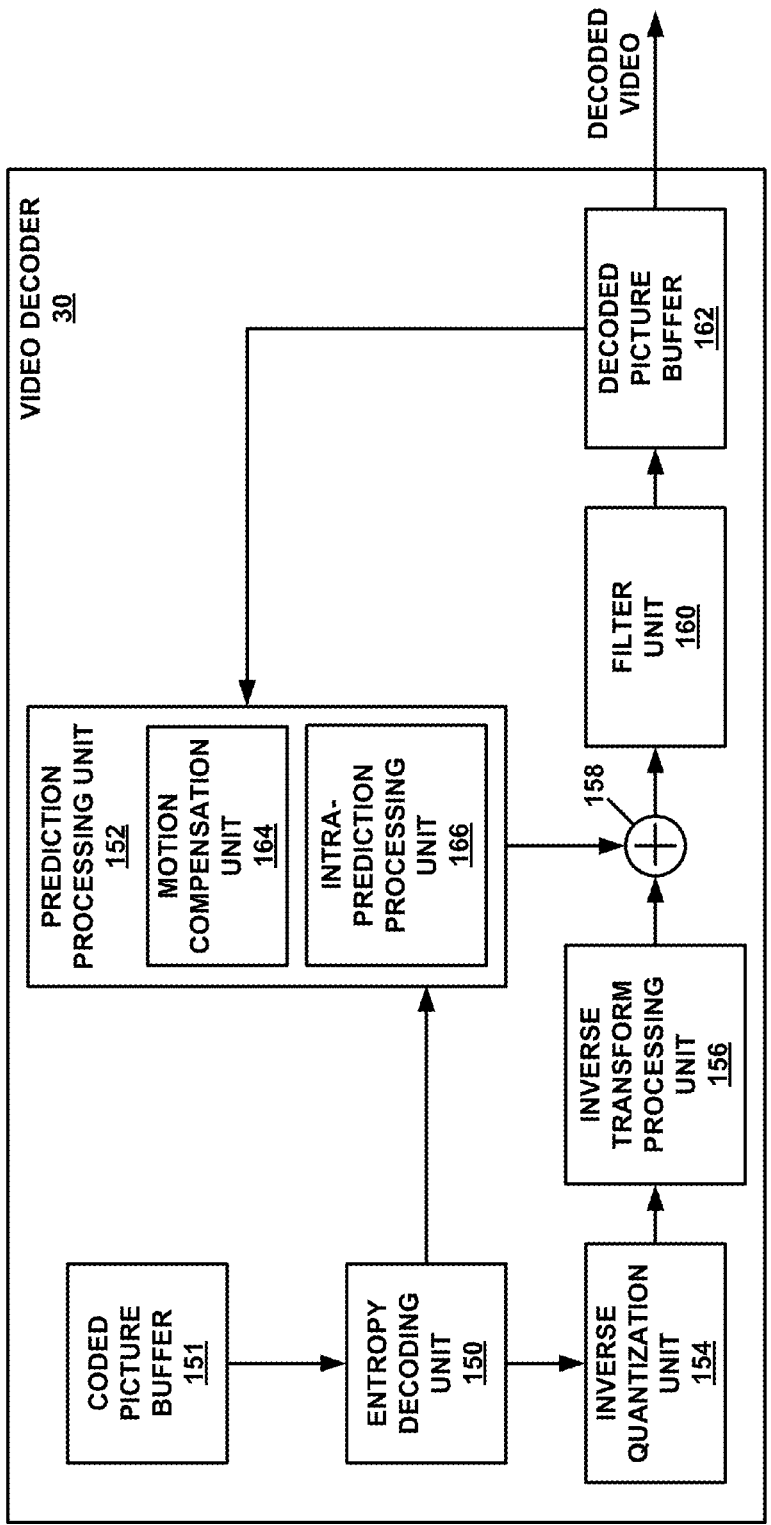
FIG. 8 is a block diagram illustrating an example video decoder that may implement the techniques described in this disclosure.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 8, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In accordance with some examples of this disclosure, the bitstream may conform to a video coding standard (e.g., HEVC or its extensions) and entropy decoding unit 150 may determine whether to obtain, from the bitstream, a weighting factor index for a current CU. In such examples, the video coding standard subjects the weighting factor index for the current CU to a constraint that requires the weighting factor index for the current CU to have a particular value (e.g., 0) when no partition of the current CU has a temporal motion vector or a disparity vector of the current CU is unavailable. In such examples, the particular value indicates that residual prediction is not to be applied with regard to the current CU. In accordance with such examples, entropy decoding unit 150 may make the determination of whether to obtain the weighting factor index for the current CU from the bitstream without determining whether any partition of the current CU has a temporal motion vector and without determining a disparity vector for the current CU. The constraint on the value of the weighting factor index for the current CU may ensure that, despite not making such determinations, video decoder 30 does not encounter an error arising out of a lack of a temporal motion vector for a partition of the current CU or a lack of a disparity vector for the current CU when applying residual prediction with regard to the current CU.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb, and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra-prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

In some examples, prediction processing unit 152 may apply residual prediction with regard to a current CU. In such examples, prediction processing unit 152 may determine a weighting factor for the current CU based on a weighting factor index for the current CU. Furthermore, prediction processing unit 152 may determine, based on the weighting factor index, whether to predict a residual signal for the current CU. Prediction processing unit 152 may predict the residual signal for the current CU (i.e., determine a residual predictor for the current CU) based on samples in a reference picture that is in the same access unit as the current picture, but in a different view than the current picture. Prediction process unit 152 may combine the residual signal with one or more predictive blocks. Reconstruction unit 158 may add the resulting samples to corresponding samples of the signaled residual data generated by inverse transform processing unit 156 to reconstruct the coding blocks of the current CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

As described elsewhere in this disclosure, some examples of this disclosure may reduce the dependence of the parsing process on information generated by the decoding process. Examples to solve the parsing issues in illumination compensation, inter-view residual prediction and advanced residual prediction are given. In some such examples, syntax element tables are kept the same. However, in some such examples the semantics of particular syntax elements and variables are changed.

Table 5, below, shows a portion of the coding_unit syntax structure that can be used in some examples of this disclosure. Table 5 is the same as Table 1, above. Table 1 shows a portion of the coding_unit syntax structure as presented in section G.7.3.9.1 of 3D-HEVC Test Model 2.

TABLE 5

| coding_unit( x0, y0, log2CbSize , ctDepth) { | |
|---|---|
| . . . | |
|     if ( icEnableFlag ) | |
|       ic_flag | u(1) |
| . . . | |

However, in accordance with one or more examples of this disclosure, the semantics of the variables and syntax elements shown in Table 5 may differ from the semantics of the variables and syntax elements shown in Table 1. For example, in Table 5, the ic_flag syntax element equal to 1 specifies that illumination compensation is used for the current CU. The ic_flag syntax element equal to 0 specifies that illumination compensation is not used for the current CU. When not present, ic_flag is inferred to be equal to 0.

In the example of Table 5, the variable icEnableFlag specifies whether the ic_flag syntax element is present in the bitstream. Furthermore, in the example of Table 5, the variable icEnableFlag is derived as:

icEnableFlag=slice_ic_enable_flag [[&& anyIvRef-
        PicFlag]]        (G-27)

In the equation above, and other portions of the present disclosure, italicized text in square brackets (e.g., [[text]]) is text removed from 3D-HEVC Test Model 2 or other applicable document. Thus, as shown in the equation above, the icEnableFlag variable is not, in this example, dependent on the variable anyIvRefPicFlag, but rather is only dependent on the slice_ic_enable_flag syntax element. In this way, responsive to determining that illumination compensation is enabled for the current slice and without determining whether at least one PU of the current CU uses an inter-view reference picture, video decoder 30 may obtain, from the bitstream, an illumination compensation flag that indicates whether illumination compensation is used for the current CU. Likewise, when illumination compensation is enabled for the current slice, video encoder 20 may include data indicating the illumination compensation flag in the bitstream, the illumination compensation flag indicating whether illumination compensation is used for the current CU, regardless of whether at least one PU of the current CU uses an inter-view reference picture.

In some examples, a constraint may be introduced such that if none of the PUs within the current CU utilizes an inter-view reference picture, the icEnableFlag variable shall be equal to 0. In other words, the video coding standard (e.g., HEVC, 3D-HEVC, etc.) subjects the illumination compensation flag in the bitstream to a constraint that requires the illumination compensation flag to specify a value (e.g., 0) that indicates that illumination compensation is not used for the current CU if no PU of the current CU uses an inter-view reference picture.

As indicated above, a coding_unit syntax structure for a CU may include a res_pred_flag syntax element that indicates whether the CU is coded using inter-view residual prediction. In accordance with one or more examples of this disclosure, the coding_unit syntax element table (i.e., the coding_unit syntax structure) is not changed. However, in such examples of this disclosure, the semantics of the resPredEnableFlag may be modified in order to make the parsing process of the res_pred_flag syntax element independent of a decoding process.

Table 6, below, shows a portion of the coding_unit syntax structure that can be used in some examples of this disclosure. Table 6 is the same as Table 2, above. Table 2 shows a portion of the coding_unit syntax structure as presented in section G.7.3.9.1 of 3D-HEVC Test Model 2.

TABLE 6

| coding_unit( x0, y0, log2CbSize , ctDepth) { | |
|---|---|
| . . . | |
|     if ( resPredEnableFlag ) | |
|       res_pred_flag | ae(v) |
| . . . | |

However, in accordance with one or more examples of this disclosure, the semantics of the variables and syntax elements shown in Table 6 may differ from the semantics of the variables and syntax elements shown in Table 2. In the example of Table 6, the res_pred_flag syntax element equal to 0 specifies that residual prediction is not used. The res_pred_flag syntax element equal to 1 specifies that residual prediction is used. When the res_pred_flag syntax element is not present, the value of the res_pred_flag syntax element shall be inferred to be equal to 0.

Furthermore, in the example of Table 6, the variable resPredEnableFlag specifies whether the res_pred_flag syntax element is present in the bitstream. In accordance with one example of this disclosure, the resPredEnableFlag is derived as:

resPredEnableFlag=multi_view_residual_pred_
　flag && PredMode !=MODE_INTRA [[&&
　residualCbfNonZero && anyTempRefPicFlag]]　(G-28)

Thus, in this example, the video coder no longer determines residualCbfNonZero and anyTempRefPicFlag when determining the value of the resPredEnableFlag variable. As indicated above, determining the residualCbfNonZero variable may require determining a corresponding block in a reference view. Hence, determining the residualCbfNonZero variable requires determining a disparity vector, which is part of a decoding process for CUs, not the parsing process for CUs. Similarly, determining the anyTempRefPicFlag variable requires determining whether one or more PUs of the current CU uses a temporal reference picture. Determining whether a PU uses a temporal reference picture may require determining a merge or AMVP candidate list. Determining merge or AMVP candidate lists is part of the decoding process for PUs, not the parsing process for CUs.

In another example of this disclosure, the video coder may derive the variable resPredEnableFlag as:

resPredEnableFlag=multi_view_residual_pred_
　flag && PredMode !=MODE_INTRA && Dis-
　pVectAvai [[residualCbfNonZero]] && anyTem-
　pRefPicFlag　(G-28), where the variable DispVectAvai is equal to 1 if a disparity vector could be found. Otherwise, it is equal to 0.

Thus, in this example, the video coder does not determine the resPredEnableFlag variable based on the residualCbfNonZero variable. However, in this example, the resPredEnableFlag depends on the DispVectAvai variable. DispVectAvai is equal to 1 if a disparity vector could be found. Otherwise, DispVectAvai is equal to 0. In this example, the disparity vector may be derived from neighboring blocks that may have been known when parsing the syntax elements of the current CU. Determining the disparity vector may not require the decoded information of the current PU/CU, although this determination may rely on some decoded information from neighboring blocks.

In another example of this disclosure, the variable resPredEnableFlag is derived as:

resPredEnableFlag=multi_view_residual_pred_
　flag && PredMode !=MODE_INTRA [[&&
　residualCbfNonZero]] && anyTempRefPicFlag　(G-28)

Thus, in this example, the video coder does not determine the resPredEnableFlag variable based on the residualCbfNonZero variable. However, in this example, the resPredEnableFlag does depend on the anyTempRefPicFlag variable.

Some examples of this disclosure introduce a constraint such that if none of the PUs in the corresponding block is inter-coded and the values of cbf_luma, cbf_cb and cbf_cr are not equal to 0, res_pred_flag shall be 0. In other words, in this example, a video coding standard (e.g., HEVC, 3D-HEVC, etc.) subjects the residual prediction flag in the bitstream to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 1. The residual prediction flag for the current CU equal to 0 indicates that residual prediction is not used for the current CU. In this example, the corresponding block is in a reference view picture.

Furthermore, in some examples, a constraint may be introduced such that if the disparity vector for the current CU is unavailable, res_pred_flag shall be 0. In some examples, a constraint is introduced such that if none of the PUs in the current CU is coded with a temporal reference picture, res_pred_flag shall be 0.

As indicated above, some examples of this disclosure use constraints in order to avoid one or more of the issues described above related to the parsing process being dependent on the decoding process. For instance, as described above, the coding_unit syntax structure may include a weighting_factor_index syntax element that indicates an index to a weighting factor used for ARP. Table 7, below, shows an example portion of the coding_unit syntax structure in accordance with one example of this disclosure.

TABLE 7

| coding_unit( x0, y0, log2CbSize , ctDepth) { | Descriptor |
|---|---|
| if( transquant_bypass_enable_flag ) { | |
| 　cu_transquant_bypass_flag | ae(v) |
| } | |
| ... | |
| } else { /* PART_NxN */ | |
| ... | |
| 　prediction_unit( x1, y1 , log2CUSize ) | |
| } | |
| if ( !depth_flag && layer_id && PredMode!= MODE_INTRA && PartMode == PART_2Nx2N ) | ae(v) |
| 　weighting_factor_index | |
| ... | |
| if( !pcm_flag ) { | |
| ... | |
| } | |

In the example of Table 7, a constraint is introduced such that if none of the partitions in the current CU has a temporal motion vector (i.e., the reference picture is from the same view), or the disparity vector of the current CU is unavailable, the weighting_factor_index syntax element shall be 0. As discussed above, if the weighting factor index syntax element is not equal to 0 and no PU of the current CU has a temporal motion vector or the disparity vector for the current CU is unavailable, a coding error may occur. Hence, some proposals have called for checking whether any PU of the current CU has a temporal motion vector and checking whether the disparity vector for the current CU is available prior to parsing the weighting factor index syntax element. Thus, in such proposals, because the weighting factor index syntax element is assumed to be 0 if the weighting factor syntax element is not present in the bitstream, the video coder would not perform residual prediction if the video decoder determined that no PU of the current CU has a temporal motion vector or the disparity vector for the current CU is unavailable. However, the determination of whether any PU of the current CU has a temporal motion vector and whether the disparity vector of the current CU is available may require information generated in the decoding process, which may slow the parsing process. Hence, in the example of Table 7, the constraint may ensure that this type of decoding error does not occur, without requiring the video decoder to check, prior to obtaining the weighting factor index syntax element from the bitstream, whether any PU of the current CU has a temporal motion vector or whether the disparity vector of the current CU is available.

Table 8, below, is a portion of the coding_unit syntax structure in accordance with another example of this disclosure.

TABLE 8

| coding_unit( x0, y0, log2CbSize , ctDepth) { | Descriptor |
|---|---|
|     if( transquant_bypass_enable_flag ) { | |
|         cu_transquant_bypass_flag | ae(v) |
|     } | |
| ... | |
|     } else { /* PART_NxN */ | |
| ... | |
|         prediction_unit( x1, y1 , log2CUSize ) | |
|     } | |
|     if ( !depth_flag && layer_id && PredMode!= MODE_INTRA && PartMode == PART_2Nx2N && TempMVAvai) | |
|         weighting_factor_index | ae(v) |
| ... | |
|     if( !pcm_flag ) { | |
| ... | |
| } | |

In the example of Table 8, a constraint may be introduced such that if the disparity vector of the current CU is unavailable, the weighting_factor_index syntax element shall be 0. TempMVAvai set equal to 1 indicates the current CU is predicted from at least one reference picture from the same view. Otherwise, TempMVAvai is set equal to 0.

Table 9, below, is a portion of the coding_unit syntax structure in accordance with another example of this disclosure.

TABLE 9

| coding_unit( x0, y0, log2CbSize , ctDepth) { | Descriptor |
|---|---|
|     if( transquant_bypass_enable_flag ) { | |
|         cu_transquant_bypass_flag | ae(v) |
|     } | |
| ... | |
|     } else { /* PART_NxN */ | |
| ... | |
|         prediction_unit( x1, y1 , log2CUSize ) | |
|     } | |
|     if ( !depth_flag && layer_id && PredMode!= MODE_INTRA && PartMode == PART_2Nx2N && DispVectAvai) | |
|         weighting_factor_index | ae(v) |
| ... | |
|     if( !pcm_flag ) { | |
| ... | |
| } | |

In the example of Table 9, a constraint is introduced such that if none of the partitions in the current CU has a temporal motion vector (i.e., all the reference pictures are from the same view), the weighting_factor_index syntax element shall be 0.

Figure 9:
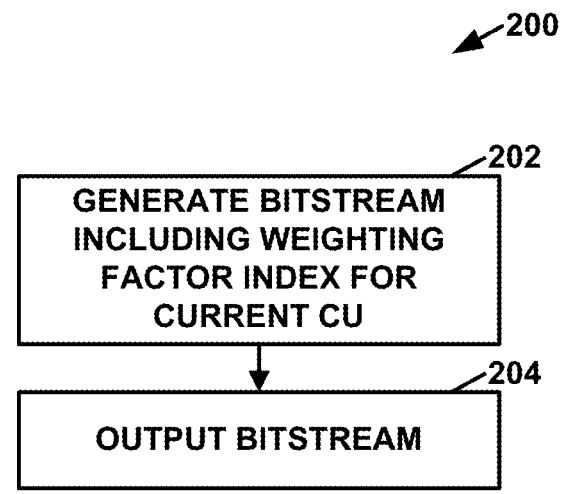
FIG. 9 is a flowchart illustrating an example operation of a video encoder, in accordance with one or more techniques of this disclosure.

FIG. 9 is a flowchart illustrating an example operation 200 of video encoder 20, in accordance with one or more techniques of this disclosure. In the example of FIG. 9, video encoder 20 generates a bitstream that conforms to a video coding standard (202). The bitstream comprises a coded representation of the video data. The bitstream includes data indicating a weighting factor index for a current CU. The video coding standard subjects the weighting factor index for the current CU to a constraint that requires the weighting factor index for the current CU to have a particular value (e.g., 0) when no partition of the current CU has a temporal motion vector or a disparity vector of the current CU is unavailable. The weighting factor index for the current CU having the particular value indicates that residual prediction is not applied with regard to the current CU. Furthermore, in the example of FIG. 9, video encoder 20 outputs the bitstream (204).

Figure 10:
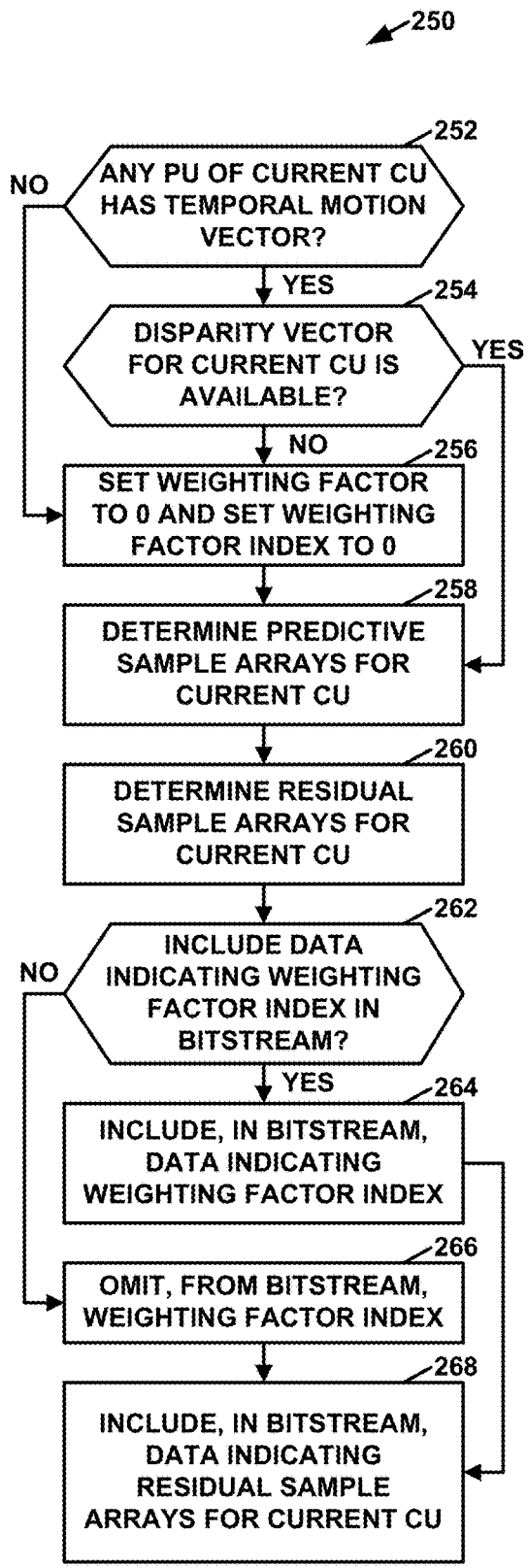
FIG. 10 is a flowchart illustrating an example operation for encoding a current CU, in accordance with one or more techniques of this disclosure.

FIG. 10 is a flowchart illustrating an example operation 250 for encoding a current CU, in accordance with one or more techniques of this disclosure. In the example of FIG. 10, video encoder 20 may determine whether any PU (i.e., any partition) of the current CU has a temporal motion vector (252). In response to determining that at least one of the PUs of the current CU has a temporal motion vector ("YES" of 252), video encoder 20 may determine whether a disparity vector for the current CU is available (254). In response to determining that the disparity vector for the current CU is not available ("NO" of 254) or in response to determining that none of the PUs of the current CU has a temporal motion vector ("NO" of 252), video encoder 20 may set a weighting factor for the current CU to 0 and may set a weighting factor index for the current CU to 0 (256).

Regardless of whether video encoder 20 sets the weighting factor and weighting factor index in action 256, video encoder 20 may determine one or more predictive sample arrays for the current CU (258). For example, video encoder 20 may determine a luma predictive sample array (e.g., predSamples$_L$) and two chroma predictive sample arrays (e.g., predSamples$_{Cb}$ and predSamples$_{Cr}$) for the current CU. Video encoder 20 may determine the predictive sample arrays for the current CU by determining predictive blocks for each PU of the current CU.

Furthermore, in the example of FIG. 10, video encoder 20 may determine residual sample arrays for the current CU (260). For example, video encoder 20 may determine a luma residual sample array (e.g., resSamples$_L$) and two chroma residual sample arrays (e.g., resSamples$_{Cb}$ and resSamples$_{Cr}$) for the current CU. Video encoder 20 may perform the example operation of FIG. 11 to determine the residual sample arrays for the current CU.

In addition, video encoder 20 may determine whether to include data indicating the weighting factor index for the current CU in a bitstream (262). The bitstream comprises a coded representation of video data. In some examples, video encoder 20 may include the data indicating the weighting factor index in the bitstream when the current CU is not a depth view component, the current CU is not in a base layer, the coding mode of the current CU is not intra prediction, and the partitioning mode of the current CU is PART_2N× 2N. In this example, the current CU may be in a picture that belongs to a current view. Thus, in this example, responsive to determining that the current view is a dependent texture view, the current CU is not intra coded, and a partitioning mode of the current CU is equal to PART_2N×2N, video encoder 20 may include, in the bitstream, data indicating the weighting factor index for the current CU.

In other examples, video encoder 20 may include the data indicating the weighting factor index in the bitstream when the current CU is not a depth view component, the current CU is not in a base layer, the coding mode of the current CU is not intra prediction, the partitioning mode of the current CU is PART_2N×2N, and the current CU is predicted from at least one reference picture from the same view. In other examples, video encoder 20 may include the data indicating the weighting factor index in the bitstream when the current CU is not a depth view component, the current CU is not in a base layer, the coding mode of the current CU is not intra prediction, the partitioning mode of the current CU is PART_2N×2N, and a disparity vector for the current CU could be found. In response to determining that the bitstream is to include data indicating the weighting factor index for the current CU ("YES" of 262), video encoder 20 may include, in the bitstream, data indicating the weighting factor index for the current CU (264). Otherwise, in response to determining that the bitstream is not to include data indicating the weighting factor index for the current CU ("NO" of 262), video encoder 20 may omit, from the bitstream, data indicating the weighting factor index for the current CU (266).

Regardless of whether video encoder 20 includes the weighting factor index for the current CU in the bitstream, video encoder 20 may include, in the bitstream, data indicating the residual sample arrays for the current CU (268). For example, video encoder 20 may partition the residual sample arrays for the current CU into transform blocks associated with one or more TUs of the current CU. In this example, video encoder 20 may apply a transform to each transform block and quantize the resulting coefficient block. Furthermore, in this example, video encoder 20 may generate syntax elements indicating the quantized coefficient blocks. In this example, video encoder 20 may entropy encode the syntax elements indicating the quantized coefficient blocks. Video encoder 20 may include the entropy encoded syntax elements in the bitstream. Thus, in this example, video encoder 20 may include, in the bitstream, data indicating the residual sample arrays for the current CU. In this way, video encoder 20 may signal the residual sample arrays in the bitstream.

Figure 11:
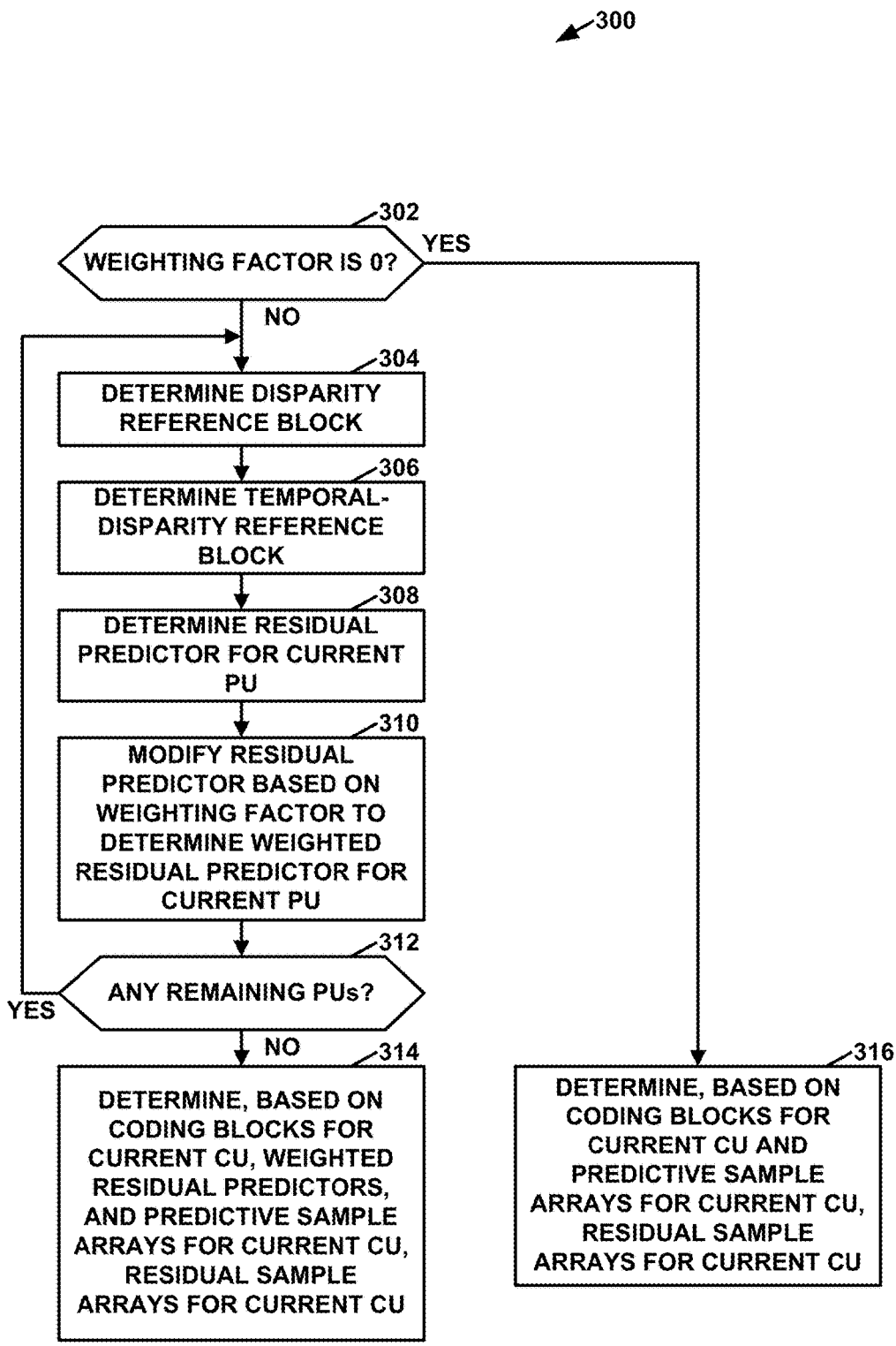
FIG. 11 is a flowchart illustrating an example operation of a video encoder for determining residual sample arrays for a current coding unit (CU).

FIG. 11 is a flowchart illustrating an example operation 300 of video encoder 20 for determining residual sample arrays for a current CU. In the example of FIG. 11, video encoder 20 may determine whether a weighting factor for the current CU has been set to 0 (302). As indicated in action 256 of FIG. 10, the weighting factor for the current CU may be set to 0 when no PU of the current CU has a temporal motion vector or the disparity vector for the current CU is not available.

In response to determining that the weighting factor for the current CU has not been set to 0 ("NO" of 302), video encoder 20 may perform ARP with respect to the current CU. Accordingly, in response to determining that the weighting factor for the current CU has not been set to 0 ("NO" of 302), video encoder 20 may determine a disparity reference block for a current PU of the current CU (304). Video encoder 20 may determine the disparity reference block from actual or interpolated samples of an inter-view reference picture (i.e., a reference picture that is associated with the same access unit as the current picture but in a different view than the current picture). Furthermore, video encoder 20 may determine a temporal disparity reference block for the current PU (306). Video encoder 20 may determine the temporal disparity reference block based on actual or interpolated samples of a reference picture that is in the same view as the disparity reference block, but is in a different access unit than the current PU or the disparity reference block.

Subsequently, video encoder 20 may determine a residual predictor for the current PU (308). Each sample in the residual predictor for the current PU may indicate a difference between corresponding samples in the disparity reference block and the temporal disparity reference block. Furthermore, video encoder 20 may modify the residual predictor based on the weighting factor for the current CU in order to determine a weighted residual predictor for the current PU (310). For example, each sample in the weighted residual predictor may be equal to a corresponding sample in the residual predictor, divided by the weighting factor.

After determining the weighted residual predictor for the current PU, video encoder 20 may determine whether there are any remaining PUs of the current CU (312). When there are remaining PUs of the current CU ("YES" of 312), video encoder 20 may again perform actions 304-312 with another PU of the current CU as the current PU. In this way, video encoder 20 may perform actions 304-312 with respect to each PU of the current CU.

In response to determining that there are no remaining PUs of the current CU ("NO" of 312), video encoder 20 may determine, based on the coding blocks of the current CU, the weighted residual predictors for the PUs of the current CU, and the predictive sample arrays for the current CU, the residual sample arrays for the current CU (314). For example, each sample in a residual sample array for the current CU may be equal to a difference between corresponding samples in a coding block for the current CU, a weighted residual predictor for a PU of the current CU, and a predictive block for a PU of the current CU.

As shown in the example of FIG. 11, when the weighting factor for the current CU is set to 0 ("YES" of 302), video encoder 20 does not perform ARP with respect to the current CU. Rather, when the weighting factor for the current CU is set to 0 ("YES" of 302), video encoder 20 may determine, based on coding blocks for the current CU and the predictive sample arrays for the current CU, the residual sample arrays for the current CU (316). For example, each sample in a residual sample array for the current CU may be equal to a difference between corresponding samples in a coding block for the current CU and a predictive block for a PU of the current CU.

In the example of FIG. 11, when the weighting factor is not previously set to 0, video encoder 20 may perform operation 300 multiple times, for each available weighting factor (e.g., 0, 0.5, and 1) and then select the weighting factor for the current CU (and the associated residual sample arrays for the current CU) based on a rate/distortion analysis.

Figure 12:
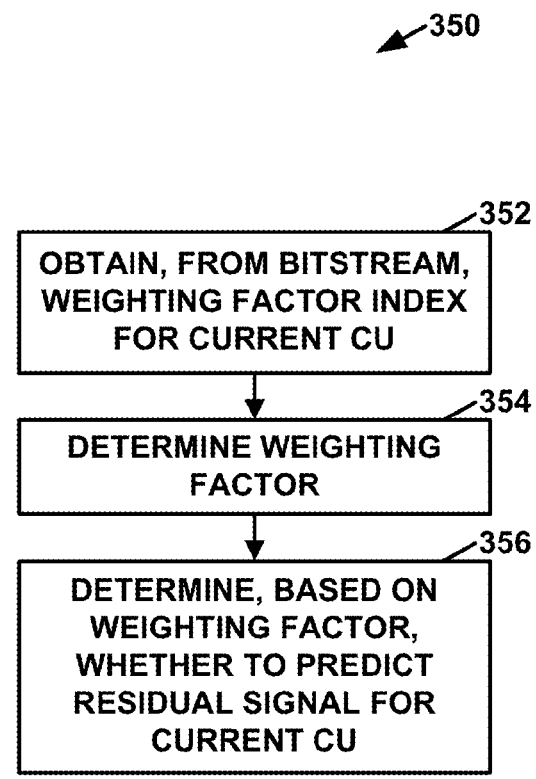
FIG. 12 is a flowchart illustrating an example operation of a video decoder, in accordance with one or more techniques of this disclosure.

FIG. 12 is a flowchart illustrating an example operation 350 of video decoder 30, in accordance with one or more techniques of this disclosure. As shown in the example of FIG. 12, video decoder 30 obtains, from a bitstream that conforms to a video coding standard, a weighting factor index for a current CU (352). The bitstream comprises an encoded representation of the video data and the video coding standard may subject the weighting factor index for the current CU to a constraint that requires the weighting factor index for the current CU to have a particular value when no partition of the current CU has a temporal motion vector or a disparity vector of the current CU is unavailable. The particular value indicates that residual prediction is not applied with regard to the current CU. In addition, video decoder 30 may determine a weighting factor based on the weighting factor index for the current CU (354).

Furthermore, video decoder 30 may determine, based on the weighting factor, whether to predict a residual signal for the current CU (356). In some examples, video decoder 30 may, responsive to determining that the weighting factor for the current CU does is not equal to the particular value, predict the residual signal for the current CU using a reference residual signal multiplied by the weighting factor. In some examples, video decoder 30 may determine the reference residual signal based on differences between a disparity reference block and a temporal disparity reference block.

Figure 13:
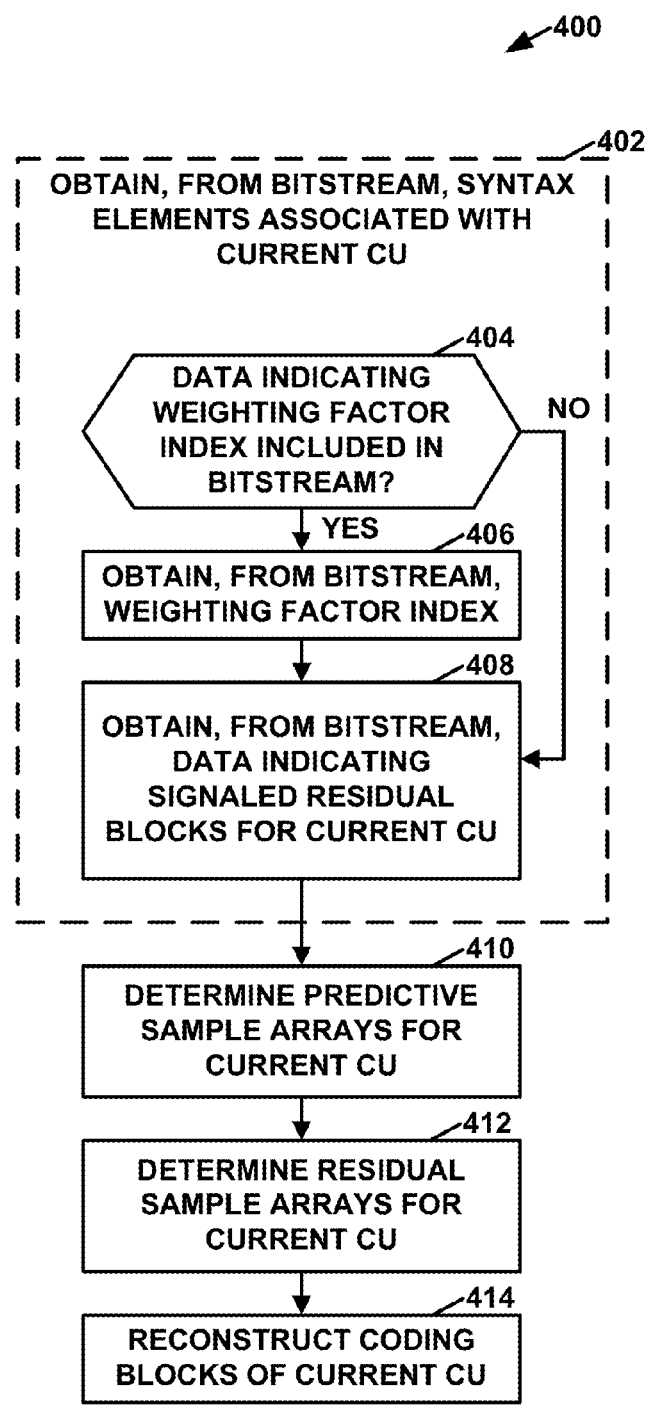
FIG. 13 is a flowchart illustrating an example operation of a video decoder for decoding a current CU, in accordance with one or more techniques of this disclosure.

FIG. 13 is a flowchart illustrating an example operation 400 of video decoder 30 for decoding a current CU, in accordance with one or more techniques of this disclosure. In the example of FIG. 13, video decoder 30 may perform an operation (e.g., a parsing operation) to obtain, from a bitstream, syntax elements associated with the current CU (402). The bitstream may comprise a coded representation of video data.

As part of performing the operation to obtain the syntax elements associated with the current CU, video decoder 30 may determine whether data indicating a weighting factor index for the current CU is included in the bitstream (404). In some examples, video decoder 30 may determine that the bitstream includes data indicating the weighting factor index when the current CU is not a depth view component, the current CU is not in a base layer, the coding mode of the current CU is not intra prediction, and the partitioning mode of the current CU is PART_2N×2N. Thus, in this example, when the current view is a dependent texture view, the current CU is not intra coded, and a partitioning mode of the current CU is equal to PART_2N×2N, video decoder 30 may obtain, from the bitstream, the weighting factor index for the current CU. Furthermore, in this example, when the current view is not a dependent texture view, the current CU is intra coded, or the partitioning mode of the current CU is not equal to PART_2N×2N, video decoder 30 may assume that the weighting factor index is equal to the particular value.

In other examples, video decoder 30 may determine that the bitstream includes data indicating the weighting factor index when the current CU is not a depth view component, the current CU is not in a base layer, the coding mode of the current CU is not intra prediction, the partitioning mode of the current CU is PART_2N×2N, and the current CU is predicted from at least one reference picture from the same view. In other examples, video decoder 30 may determine that the bitstream includes data indicating the weighting factor index when the current CU is not a depth view component, the current CU is not in a base layer, the coding mode of the current CU is not intra prediction, the partitioning mode of the current CU is PART_2N×2N, and a disparity vector for the current CU could be found.

In response to determining that the bitstream includes data indicating the weighting factor index for the current CU ("YES" of 404), video decoder 30 may obtain, from the bitstream, the data indicating the weighting factor index for the current CU (406). For example, video decoder 30 may obtain, based on data in the bitstream, a syntax element (e.g., weighting_factor_index) that indicates the weighting factor index for the current CU.

In accordance with some example techniques of this disclosure, a constraint is applied such that the weighting factor index is equal to a particular value (e.g., 0) when no partition (e.g., PU) of the current CU has a temporal motion vector or the disparity vector for the current CU is unavailable. In other examples, a constraint is applied such that the weighting factor index is equal to the particular value (e.g., 0) when the disparity vector for the current CU is unavailable. In another example, a constraint is applied such that the weighting factor is equal to the particular value (e.g., 0) when none of the partitions (e.g., PUs) of the current CU has a temporal motion vector.

Regardless of whether video decoder 30 obtains the data indicating the weighting factor index from the bitstream, video decoder 30 may obtain, from the bitstream, data indicating one or more signaled residual blocks for the current CU (408). For example, video decoder 30 may obtain, based on data in the bitstream, syntax elements that indicate quantized coefficient blocks associated with TUs of the current CU. In this example, video decoder 30 may inverse quantize and apply an inverse transform to the quantized coefficient blocks in order to obtain the signaled residual sample blocks for the current CU.

Furthermore, in the example of FIG. 13, video decoder 30 may determine predictive sample arrays for the current CU (410). Video decoder 30 may use one or more reference pictures and syntax elements specified for PUs of the current CU to determine the predictive sample arrays for the current CU. In addition, video decoder 30 may determine, based at least in part on the signaled residual blocks for the current CU, residual sample arrays for the current CU (412). Video decoder 30 may perform the example operation of FIG. 14 to determine the residual sample arrays for the current CU. Video decoder 30 may then reconstruct, based on the predictive sample arrays for the current CU and the residual sample arrays for the current CU, coding blocks for the current CU (414). In some examples, each sample in a coding block for the current CU may be equal to a sum of corresponding samples in a predictive sample array for the current CU and a residual sample array for the current CU. In some examples, when video decoder 30 reconstructs the coding blocks for the current CU, video decoder 30 applies one or more deblocking filters.

Figure 14:
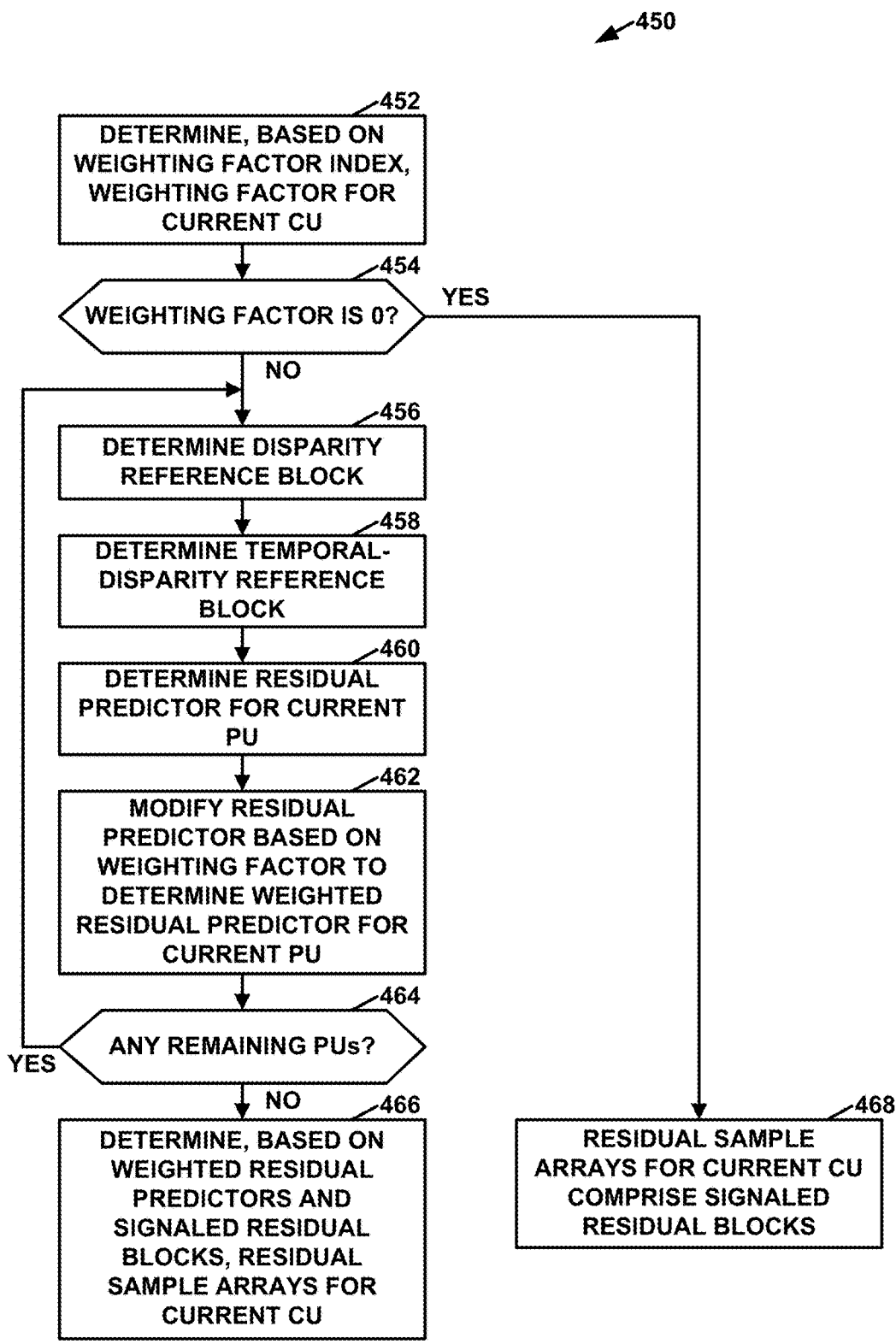
FIG. 14 is a flowchart illustrating an example operation of a video decoder for determining residual sample arrays for a current CU, in accordance with one or more techniques of this disclosure.

FIG. 14 is a flowchart illustrating an example operation 450 of video decoder 30 for determining residual sample arrays for a current CU, in accordance with one or more techniques of this disclosure. In the example of FIG. 14, video decoder 30 may determine, based on a weighting factor index for the current CU, a weighting factor for the current CU (452). For example, if the weighting factor index for the current CU is equal to 0, 1, or 2, video decoder 30 may determine that the weighting factor for the current CU is equal to 0, 0.5, or 1, respectively.

Video decoder 30 may then determine whether the weighting factor for the current CU is equal to 0 (454). When the weighting factor for the current CU is not equal to 0, video decoder 30 may perform ARP with regard to the current CU. Hence, in response to determining that the weighting factor for the current CU is not equal to 0 ("NO" of 454), video decoder 30 may determine a disparity reference block for a current PU of the current CU (456). Video decoder 30 may determine the disparity reference block from actual or interpolated samples of an inter-view reference picture (i.e., a reference picture that is in the same access unit as the current picture but in a different view than the current picture). Furthermore, video decoder 30 may determine a temporal disparity reference block for the current PU (458). Video decoder 30 may determine the temporal disparity reference block based on actual or interpolated samples of a reference picture that is in the same view as the disparity reference block, but is in a different access unit than the current PU or the disparity reference block.

Subsequently, video decoder 30 may determine a residual predictor for the current PU (460). Each sample in the residual predictor for the current PU may indicate a difference between corresponding samples in the disparity reference block and the temporal disparity reference block. Furthermore, video decoder 30 may modify the residual predictor based on the weighting factor for the current CU in order to determine a weighted residual predictor for the current PU (462). For example, each sample in the weighted residual predictor may be equal to a corresponding sample in the residual predictor, multiplied by the weighting factor for the current CU.

After determining the weighted residual predictor for the current PU, video decoder 30 may determine whether there are any remaining PUs of the current CU (464). When there are remaining PUs of the current CU ("YES" of 464), video decoder 30 may again perform actions 456-464 with another PU of the current CU as the current PU. In this way, video decoder 30 may perform actions 456-464 with respect to each PU of the current CU.

In response to determining that there are no remaining PUs of the current CU ("NO" of 464), video decoder 30 may determine, based on the weighted residual predictors for the PUs of the current CU and the signaled residual blocks for the current CU, the residual sample arrays for the current CU (466). For example, each sample in a residual sample array for the current CU may be equal to a sum of corresponding samples in a weighted residual predictor for a PU of the current CU and a signaled residual block for the current CU.

As shown in the example of FIG. 14, when the weighting factor for the current CU is set to 0 ("YES" of 454), video decoder 30 does not perform ARP with respect to the current CU. Rather, when the weighting factor for the current CU is set to 0 ("YES" of 454), the residual sample arrays for the current CU comprise the signaled residual blocks for the current CU (468).

Figure 15A:
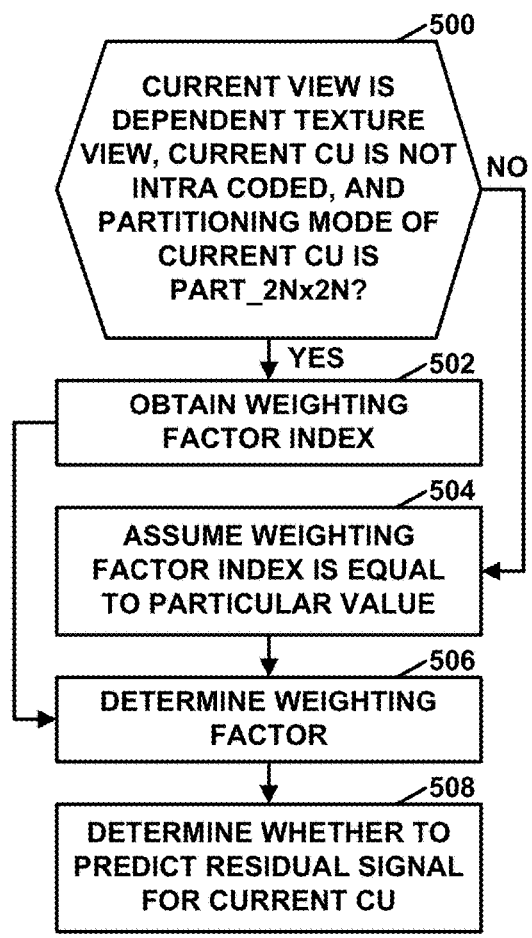
FIG. 15A is a flowchart illustrating an example operation of a video decoder, in accordance with an example of this disclosure.

FIG. 15A is a flowchart illustrating an example operation of video decoder 30, in accordance with an example of this disclosure. In the example of FIG. 15A, video decoder 30 may determine whether a current view is a dependent texture view, whether a current CU is not intra coded, and whether a partitioning mode of the current CU is equal to PART_2N× 2N (500). When the current view is a dependent texture view, the current CU is not intra coded, and the partitioning mode of the current CU is equal to PART_2N×2N ("YES" of 500), video decoder 30 may obtain, from a bitstream that comprises an encoded representation of the video data, a weighting factor index for the current CU (502). The current CU is in a picture belonging to a current view. When the current view is not a dependent texture view, or the current CU is intra coded, or the partitioning mode of the current CU is not equal to PART_2N×2N ("NO" of 500), video decoder 30 may assume that the weighting factor index is equal to a particular value that indicates that residual prediction is not applied with regard to the current CU (504). In addition, video decoder 30 may determine a weighting factor based on the weighting factor index for the current CU (506). Video decoder 30 may also determine, based on the weighting factor, whether to predict a residual signal for the current CU (508).

Figure 15B:
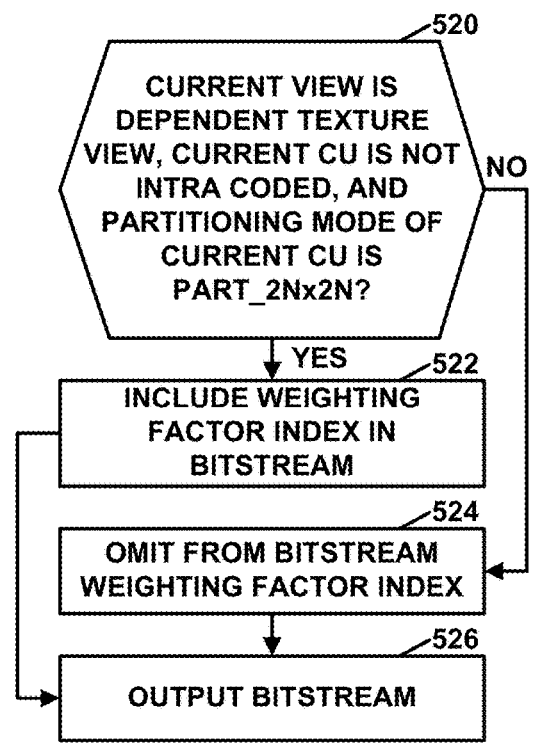
FIG. 15B is a flowchart illustrating an example operation of a video encoder, in accordance with an example of this disclosure.

FIG. 15B is a flowchart illustrating an example operation of video encoder 20, in accordance with an example of this disclosure. In the example of FIG. 15B, video encoder 20 may determine whether a current view is a dependent texture view, whether a current CU is not intra coded, and whether a partitioning mode of the current CU is equal to PART_2N× 2N (520). Responsive to determining that the current view is a dependent texture view, the current CU is not intra coded, and the partitioning mode of the current CU is equal to PART_2N×2N ("YES" of 520), video encoder 20 may include, in a bitstream that comprises an encoded representation of video data, data indicating a weighting factor index for the current CU (522). The current CU is in a picture belonging to the current view. However, responsive to determining that the current view is not a dependent texture view, or the current CU is not intra coded, or the partitioning mode of the current CU is not equal to PART_2N×2N ("NO" of 520), video encoder 20 may omit, from the bitstream, the data indicating the weighting factor index for the current CU (524). In either case, video encoder 20 may output the bitstream (526).

Figure 16A:
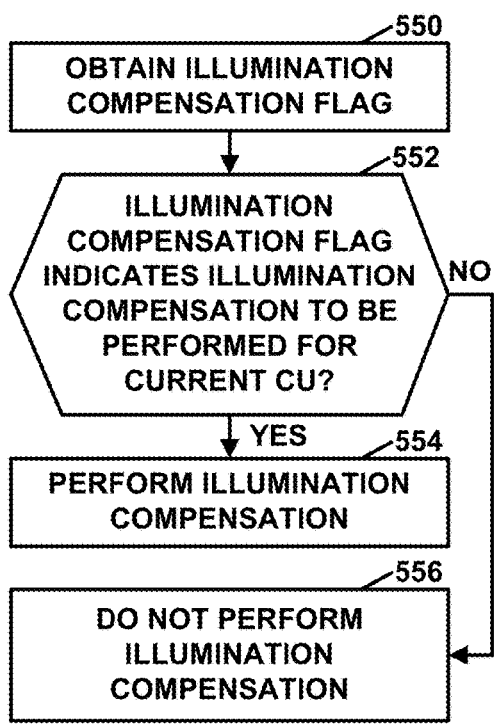
FIG. 16A is a flowchart illustrating an example operation of a video decoder, in accordance with an example of this disclosure.

FIG. 16A is a flowchart illustrating an example operation of video decoder 30, in accordance with an example of this disclosure. In the example of FIG. 16A, video decoder 30 may obtain, from a bitstream that conforms to a video coding standard and includes an encoded representation of the video data, an illumination compensation flag that indicates whether illumination compensation is used for a current CU (550). The video coding standard may subject the illumination compensation flag to a constraint that requires the illumination compensation flag to specify a value that indicates that illumination compensation is not used for the current CU if no PU of the current CU uses an inter-view reference picture. Furthermore, video decoder 30 may determine whether the illumination compensation flag indicates that illumination compensation is to be performed for the current CU (552). Responsive to determining based on the illumination compensation flag that illumination compensation is to be performed for the current CU ("YES" of 552), video decoder 30 may perform illumination compensation for the current CU (554). Otherwise, responsive to determining based on the illumination compensation flag that illumination compensation is not to be performed for the current CU ("NO" of 552), video decoder 30 does not perform illumination compensation for the current CU (556)

Figure 16B:
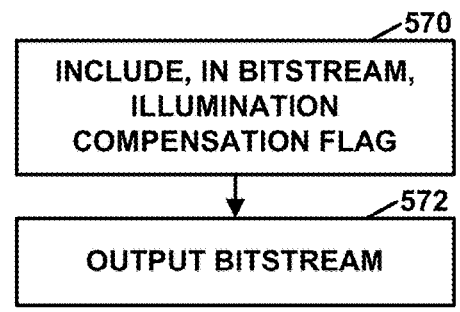
FIG. 16B is a flowchart illustrating an example operation of a video encoder, in accordance with an example of this disclosure.

FIG. 16B is a flowchart illustrating an example operation of video encoder 20, in accordance with an example of this disclosure. In the example of FIG. 16B, video encoder 20 may include, in a bitstream that conforms to a video coding standard and includes an encoded representation of video data, an illumination compensation flag that indicates whether illumination compensation is used for a current CU (570). The video coding standard may subject the illumination compensation flag to a constraint that requires the illumination compensation flag to specify a value that indicates that illumination compensation is not used for the current CU if no PU of the current CU uses an inter-view reference picture. Video encoder 20 may output the bitstream (572).

Figure 17A:
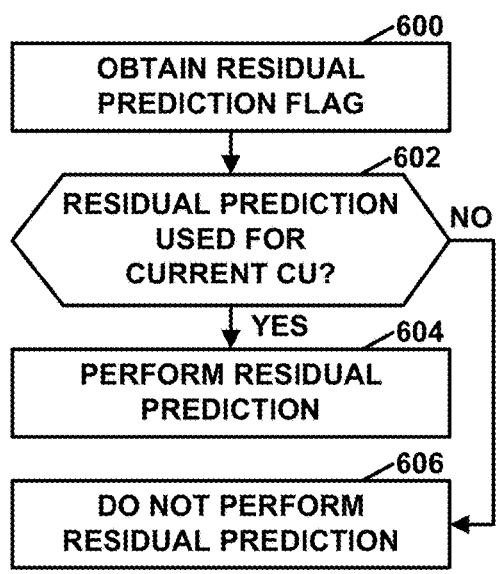
FIG. 17A is a flowchart illustrating an example operation of a video decoder, in accordance with an example of this disclosure.

FIG. 17A is a flowchart illustrating an example operation of video decoder 30, in accordance with an example of this disclosure. In the example of FIG. 17A, video decoder 30 may obtain, from a bitstream that conforms to a video coding standard and includes an encoded representation of the video data, a residual prediction flag for a current CU (600). The residual prediction flag for the current CU equal to 0 may indicate that residual prediction is not used for the current CU, and the video coding standard subjects the residual prediction flag to a constraint requiring the residual prediction flag to be equal to 0 if no PU within a corresponding block of the current CU is inter-coded, or if no PU within the corresponding block of the current CU has values of luma and chroma CBFs unequal to 0. The corresponding block is in a reference view picture. In some examples, video decoder 30 may obtain the residual prediction flag from the bitstream responsive to determining that residual prediction is enabled for the current CU and without determining whether at least one PU within the corresponding block of the current CU is not intra-coded, and without determining values of the luma CBF and chroma CBFs of the corresponding block of the current CU are not equal to 0.

Furthermore, in the example of FIG. 17A, video decoder 30 may determine, based on the residual prediction flag, whether residual prediction is used for the current CU (602). Responsive to determining based on the residual prediction flag that residual prediction is used for the current CU ("YES" of 602), video decoder 30 may perform residual prediction for the current CU (604). Otherwise, responsive to determining that residual prediction is not used for the current CU ("NO" of 602), video decoder 30 does not perform residual prediction for the current CU (606).

Figure 17B:
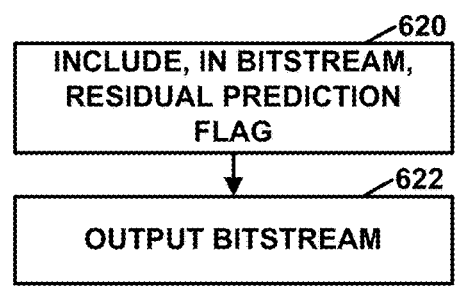
FIG. 17B is a flowchart illustrating an example operation of a video encoder, in accordance with an example of this disclosure.

FIG. 17B is a flowchart illustrating an example operation of video encoder 20, in accordance with an example of this disclosure. In the example of FIG. 17B, video encoder 20 may include, in a bitstream that conforms to a video coding standard and includes an encoded representation of the video data, a residual prediction flag for a current CU (620). The residual prediction flag for the current CU equal to 0 may indicate that residual prediction is not used for the current CU, and the video coding standard subjects the residual prediction flag to a constraint requiring the residual prediction flag to be equal to 0 if no PU within a corresponding block of the current CU is inter-coded, or if no PU within the corresponding block of the current CU has values of luma and chroma CBFs unequal to 0. The corresponding block is in a reference view picture. In some examples, video encoder 20 may include the residual prediction flag in the bitstream when residual prediction is enabled for the current CU, but without determining whether at least one PU within the corresponding block of the current CU is not intra-coded, and without determining values of the luma CBF and chroma CBFs of the corresponding block of the current CU are not equal to 0. Furthermore, video encoder 20 may output the bitstream (622).

This disclosure discloses various examples techniques for video encoding and video decoding, some of which are presented below.

Example 1

A method of decoding video data, the method comprising: determining, based on a value of a syntax element that indicates whether illumination compensation is available for a current slice and not based on a variable that specifies whether one or more PUs of a current CU utilize an inter-view reference picture, a value of a variable; and in response to determining that the value of the variable is a particular value, parsing, from a bitstream, an illumination compensation flag that indicates whether illumination compensation is enabled for the current CU.

Example 2

The method of example 1, wherein the variable does not have the particular value if no PU of the current CU utilizes an inter-view reference picture.

Example 3

A method of encoding video data, the method comprising: determining, based on whether illumination compensation is available for a current slice and not based on whether one or more PUs of a current CU utilize an inter-view reference picture, a value of a variable; and in response to determining that the value of the variable is a particular value including, in a bitstream, an illumination compensation flag that indicates whether illumination compensation is enabled for the current CU.

Example 4

The method of example 3, wherein the variable does not have the particular value if no PU of the current CU utilizes an inter-view reference picture.

Example 5

A method of decoding video data, the method comprising: determining, without reference to coded block flags (CBFs) of prediction units (PUs) of a corresponding block of a current coding unit (CU), a value of a variable; and in response to determining that the variable has a particular value, parsing, from a bitstream, a residual prediction flag that indicates whether residual prediction is used for the current CU.

Example 6

The method of example 5, wherein determining the value of the variable comprises determining, based at least in part on whether a prediction mode of the current CU is intra mode, the value of the variable.

Example 7

The method of example 5, wherein determining the value of the variable comprises determining the value of the variable without determining whether one or more PUs of the current CU utilize a temporal reference picture.

Example 8

The method of example 5, wherein determining the value of the variable comprises determining the value of the variable based at least in part on whether a disparity vector is found for the current CU.

Example 9

The method of example 5, wherein the value of the variable is not equal to the particular value if the PUs of the current CU are inter-coded and the values of coded block flags of the current CU are not equal to 0.

Example 10

The method of example 5, wherein the value of the variable is not equal to the particular value if a disparity vector of the current CU is unavailable.

Example 11

The method of example 5, wherein the value of the variable is not equal to the particular value if none of the PUs of the current CU is coded with a temporal reference picture.

Example 12

A method of encoding video data, the method comprising generating a bitstream such that a video decoder is able to determine, without reference to coded block flags (CBFs) of prediction units (PUs) of a corresponding block of current coding unit (CU), whether the bitstream includes a residual prediction flag that indicates whether residual prediction is used for the current CU.

Example 13

The method of example 12, wherein generating the bitstream comprises generating the bitstream such that the video decoder is able to determine, based at least in part on whether a prediction mode of the current CU is intra mode, whether the bitstream includes the residual prediction flag.

Example 14

The method of example 12, wherein generating the bitstream comprises generating the bitstream such that the video decoder is able to determine whether the bitstream includes the residual prediction flag without determining whether one or more PUs of the current CU utilize a temporal reference picture.

Example 15

The method of example 12, wherein generating the bitstream comprises generating the bitstream such that the video decoder is able to determine whether the bitstream includes the residual prediction flag based at least in part on whether a disparity vector is found for the current CU.

Example 16

The method of example 12, wherein the bitstream does not include the residual prediction flag if the PUs of the current CU are inter-coded and the values of coded block flags of the current CU are not equal to 0.

Example 17

The method of example 12, wherein the bitstream does not include the residual prediction flag if a disparity vector of the current CU is unavailable.

Example 18

The method of example 12, wherein the bitstream does not include the residual prediction flag if none of the PUs of the current CU is coded with a temporal reference picture.

Example 19

A method of decoding video data, the method comprising: determining that a weighting factor index has a particular value when no partition of a current coding unit (CU) has a temporal motion vector or the disparity vector of the current CU is unavailable; determining a weighting factor based on the weighting factor index; and determining, based on the weighting factor, whether to predict a residual signal for the current CU.

Example 20

A method for encoding video data, the method comprising generating a bitstream such that a video decoder is able to perform the method of example 19.

Example 21

A method of decoding video data, the method comprising: determining, based at least in part on whether a current coding unit (CU) is predicted from at least one reference picture from a same view as the current CU, whether to parse, from a bitstream, a syntax element that indicates a weighting factor index; determining that the weighting factor index is equal to a particular value if a disparity vector of the current CU is unavailable; determining a weighting factor based on the weighting factor index; and determining, based on the weighting factor, whether to predict a residual signal for the current CU.

Example 22

A method of encoding video data, the method comprising generating a bitstream such that a video decoder is able to perform the method of example 21.

Example 23

A method of decoding video data, the method comprising: determining, based at least in part on whether a disparity vector is found for a current coding unit (CU), whether to parse, from a bitstream, a syntax element that indicates a weighting factor index; determining that the weighting factor index is equal to a particular value if no partition of the current CU has a temporal motion vector; determining a weighting factor based on the weighting factor index; and determining, based on the weighting factor, whether to predict a residual signal for the current CU.

Example 24

A non-transitory computer-readable data storage medium having instructions stored thereon that, when executed, cause a video decoding device to: obtain, from a bitstream that conforms to a video coding standard, a weighting factor index for a current coding unit (CU), wherein the bitstream comprises an encoded representation of the video data and the video coding standard subjects the weighting factor index for the current CU to a constraint that requires the weighting factor index for the current CU to have a particular value when no partition of the current CU has a temporal motion vector or a disparity vector of the current CU is unavailable, wherein the particular value indicates that residual prediction is not applied with regard to the current CU; determine a weighting factor based on the weighting factor index for the current CU; and determine, based on the weighting factor, whether to predict a residual signal for the current CU.

Example 25

A video encoding device comprising one or more processors configured to: generate a bitstream that conforms to a video coding standard, the bitstream comprising a coded representation of the video data, wherein the bitstream includes data indicating a weighting factor index for a current coding unit (CU), wherein the video coding standard requires the weighting factor index for the current CU to have a particular value when no partition of the current CU has a temporal motion vector or a disparity vector of the current CU is unavailable, wherein the weighting factor index for the current CU having the particular value indicates that residual prediction is not applied with regard to the current CU; and output the bitstream.

Example 26

A video encoding device comprising means for generating a bitstream that conforms to a video coding standard, the bitstream comprising a coded representation of the video data, wherein the bitstream includes data indicating a weighting factor index for a current coding unit (CU), wherein the video coding standard requires the weighting factor index for the current CU to have a particular value when no partition of the current CU has a temporal motion vector or a disparity vector of the current CU is unavailable, wherein the weighting factor index for the current CU having the particular value indicates that residual prediction is not applied with regard to the current CU; and means for outputting the bitstream.

Example 27

A non-transitory computer-readable data storage medium having instructions stored thereon that, when executed, cause a video decoding device to generate a bitstream that conforms to a video coding standard, the bitstream comprising a coded representation of the video data, wherein the bitstream includes data indicating a weighting factor index for a current coding unit (CU), wherein the video coding standard requires the weighting factor index for the current CU to have a particular value when no partition of the current CU has a temporal motion vector or a disparity vector of the current CU is unavailable, wherein the weighting factor index for the current CU having the particular value indicates that residual prediction is not applied with regard to the current CU; and output the bitstream.

Any details of any of the examples above may be combined with other examples, consistent with this disclosure. In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of decoding video data, the method comprising:
when a current view is a dependent texture view, a current coding unit (CU) is not intra coded, and a partitioning mode of the current CU is equal to PART_2N×2N:
obtaining, by a video decoder, from a bitstream that comprises a sequence of bits that forms an encoded representation of the video data, a weighting factor index for the current CU, wherein the current CU is in a picture belonging to a current view, wherein the bitstream conforms to a video coding standard that subjects the weighting factor index for the current CU to a constraint that requires the weighting factor index for the current CU to be equal to a particular value when no partition of the current CU has a temporal motion vector or a disparity vector of the current CU is unavailable; and
determining, by the video decoder, a weighting factor based on the weighting factor index;
when the current view is not a dependent texture view, or the current CU is intra coded, or the partitioning mode of the current CU is not equal to PART_2N×2N, assuming, by the video decoder, that the weighting factor is equal to the particular value, wherein the weighting factor having the particular value indicates that residual prediction is not applied with regard to the current CU;
responsive to determining that the weighting factor is not equal to the particular value, predicting, by the video decoder, a residual signal for the current CU using a reference residual signal multiplied by the weighting factor; and using, by the video decoder, the residual signal and one or more predictive blocks of prediction units (PUs) of the current CU to reconstruct a pixel block of the current CU.

2. The method of claim 1, wherein the video coding standard subjects a residual prediction flag in the bitstream to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the residual prediction flag for the current CU equal to 0 indicates that residual prediction is not used for the current CU, and wherein the corresponding block is in a reference view picture.

3. The method of claim 2, further comprising obtaining, by the video decoder, the residual prediction flag from the bitstream responsive to determining that residual prediction is enabled for the current CU and without determining whether at least one PU within the corresponding block of the current CU is not intra-coded, and without determining that the values of the luma and chroma CBFs of the corresponding block of the current CU are not equal to 0.

4. The method of claim 1, wherein the video coding standard subjects an illumination compensation flag in the bitstream to a constraint that requires the illumination compensation flag to specify a value that indicates that illumination compensation is not used for the current CU if no PU of the current CU uses an inter-view reference picture.

5. The method of claim 4, wherein:
the current CU is in a current slice, and
the method further comprises, responsive to determining that illumination compensation is enabled for the current slice and without determining whether at least one PU of the current CU uses an inter-view reference picture, obtaining, by the video decoder, the illumination compensation flag from the bitstream, the illumination compensation flag indicating whether illumination compensation is used for the current CU.

6. The method of claim 1, wherein the particular value is equal to 0.

7. A method of encoding video data, the method comprising:
receiving, by a video encoder, the video data;
responsive to determining that a current view is a dependent texture view, a current coding unit (CU) is not intra coded, and a partitioning mode of the current CU is equal to PART_2N×2N, including, by the video encoder, in a bitstream that comprises a sequence of bits that forms an encoded representation of the video data, data indicating a weighting factor index for the current CU, wherein the current CU is in a picture belonging to the current view, wherein the bitstream conforms to a video coding standard that subjects the weighting factor index for the current CU to a constraint that requires the weighting factor index for the current CU to be equal to a particular value when no partition of the current CU has a temporal motion vector or a disparity vector of the current CU is unavailable, wherein the weighting factor index for the current CU indicates an index to a weighting factor used for residual prediction, and the weighting factor being equal to the particular value indicates that residual prediction is not applied with regard to the current CU;

responsive to determining that the current view is not a dependent texture view, or the current CU is not intra coded, or the partitioning mode of the current CU is not equal to PART_2N×2N, omitting, by the video encoder, from the bitstream, the data indicating the weighting factor index for the current CU;

based on the weighting factor not being equal to the particular value:
determining, by the video encoder, a reference residual signal; and
determining, by the video encoder, final residual data for the current CU using the reference residual signal multiplied by the weighting factor; and
outputting, by the video encoder, the bitstream.

8. The method of claim 7, wherein the video coding standard subjects a residual prediction flag in the bitstream to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the residual prediction flag for the current CU equal to 0 indicates that residual prediction is not used for the current CU, and wherein the corresponding block is in a reference view picture.

9. The method of claim 7, wherein the video coding standard subjects an illumination compensation flag in the bitstream to a constraint that requires the illumination compensation flag to specify a value that indicates that illumination compensation is not used for the current CU if no PU of the current CU uses an inter-view reference picture.

10. The method of claim 9, wherein:
the current CU is in a current slice, and
the method further comprises:
when illumination compensation is enabled for the current slice, including, by the video encoder, data indicating the illumination compensation flag in the bitstream, the illumination compensation flag indicating whether illumination compensation is used for the current CU, regardless of whether at least one PU of the current CU uses an inter-view reference picture.

11. The method of claim 7, wherein the particular value is equal to 0.

12. A video decoding device comprising a memory and a video decoder implemented as circuitry or a combination of circuitry and software, the video decoder configured to:
when a current view is a dependent texture view, a current coding unit (CU) is not intra coded, and a partitioning mode of the current CU is equal to PART_2N×2N:
obtain, from a bitstream that comprises a sequence of bits that forms an encoded representation of video data, a weighting factor index for the current CU, wherein the current CU is in a picture belonging to a current view, wherein the bitstream conforms to a video coding standard that subjects the weighting factor index for the current CU to a constraint that requires the weighting factor index for the current CU to be equal to a particular value when no partition of the current CU has a temporal motion vector or a disparity vector of the current CU is unavailable; and
determine a weighting factor based on the weighting factor index;

when the current view is not a dependent texture view, or the current CU is intra coded, or the partitioning mode of the current CU is not equal to PART_2N×2N, assume that the weighting factor is equal to the particular value, wherein the weighting factor index having the particular value indicates that residual prediction is not applied with regard to the current CU;

responsive to determining that the weighting factor is not equal to the particular value, predict a residual signal for the current CU using a reference residual signal multiplied by the weighting factor; and use the residual signal and one or more predictive blocks of prediction units (PUs) of the current CU to reconstruct a pixel block of the current CU.

13. The video decoding device of claim 12, wherein the video coding standard subjects a residual prediction flag in the bitstream to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, wherein the residual prediction flag for the current CU equal to 0 indicates that residual prediction is not used for the current CU, and wherein the corresponding block is in a reference view picture.

14. The video decoding device of claim 13, wherein the video decoder is configured obtain the residual prediction flag from the bitstream responsive to determining that residual prediction is enabled for the current CU and without determining whether at least one PU within the corresponding block of the current CU is not intra-coded, and without determining that the values of the luma and chroma CBFs of the corresponding block of the current CU are not equal to 0.

15. The video decoding device of claim 12, wherein the video coding standard subjects an illumination compensation flag in the bitstream to a constraint that requires the illumination compensation flag to specify a value that indicates that illumination compensation is not used for the current CU if no PU of the current CU uses an inter-view reference picture.

16. The video decoding device of claim 15, wherein:
the current CU is in a current slice, and
the video decoder is configured such that, responsive to determining that illumination compensation is enabled for the current slice and without determining whether at least one PU of the current CU uses an inter-view reference picture, the one or more processors obtain the illumination compensation flag from the bitstream, the illumination compensation flag indicating whether illumination compensation is used for the current CU.

17. The video decoding device of claim 12, wherein the video decoding device comprises at least one of:
an integrated circuit;
a microprocessor; or
a wireless handset.

18. The video decoding device of claim 12, further comprising a display configured to display decoded video data.

19. The video decoding device of claim 12, wherein the particular value is equal to 0.

20. A video decoding device comprising a memory and a video decoder implemented as circuitry or a combination of circuitry and software, the video decoder configured to:
responsive to determining that illumination compensation is enabled for a current slice and without determining whether at least one prediction unit (PU) of a current coding unit (CU) uses an inter-view reference picture, obtain, from a bitstream that conforms to a video coding standard and includes a sequence of bits that forms an encoded representation of video data, an illumination compensation flag that indicates whether illumination compensation is used for the current CU, wherein the video coding standard subjects the illumination compensation flag to a constraint that requires the illumination compensation flag to specify a value that indicates that illumination compensation is not used for the current CU if no PU of the current CU uses an inter-view reference picture;

responsive to determining based on the illumination compensation flag that illumination compensation is to be performed for the current CU, perform illumination compensation for the current CU, wherein performing illumination compensation for the current CU comprises filtering a prediction signal of a PU of the current CU; and use a residual signal and the prediction signal of the PUs of the current CU to reconstruct a coding block of the current CU.

21. The video decoding device of claim 20, wherein the value that indicates that illumination compensation is not used for the current CU is 0.

22. A video decoding device comprising a memory and a video decoder implemented as circuitry or a combination of circuitry and software, the video decoder configured to:
obtain, from a bitstream that conforms to a video coding standard and includes a sequence of bits that forms an encoded representation of video data, a residual prediction flag for a current coding unit (CU), wherein:
the residual prediction flag for the current CU equal to 0 indicates that residual prediction is not used for the current CU,
the video coding standard subjects the residual prediction flag to a constraint requiring the residual prediction flag to be equal to 0 if no prediction unit (PU) within a corresponding block of the current CU is inter-coded, or if no PU within the corresponding block of the current CU has values of luma and chroma coded block flags (CBFs) unequal to 0, and
the corresponding block is in a reference view picture;
generate one or more motion compensated predictors;
determine residual data signaled in the bitstream; and
responsive to determining based on the residual prediction flag that residual prediction is used for the current CU, perform, by the video decoder, residual prediction for the current CU, wherein the video decoder is configured such that, as part of performing residual prediction for the current CU, the video decoder:
locates, based on a disparity vector, a residual signal of the corresponding block; and
reconstructs a coding block of the current CU by adding the residual signal of the corresponding block to the one or more motion compensated predictors and the residual data signaled in the bitstream.

23. The video decoding device of claim 22, wherein the video decoder is configured obtain the residual prediction flag from the bitstream responsive to determining that residual prediction is enabled for the current CU and without determining whether at least one PU within the corresponding block of the current CU is not intra-coded, and without determining that the values of the luma and chroma CBFs of the corresponding block of the current CU are not equal to 0.

* * * * *